US008457285B2

(12) United States Patent
Yasuda

(10) Patent No.: US 8,457,285 B2
(45) Date of Patent: Jun. 4, 2013

(54) COMMUNICATION DEVICE

(75) Inventor: Masaru Yasuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1633 days.

(21) Appl. No.: 11/838,664

(22) Filed: Aug. 14, 2007

(65) Prior Publication Data
US 2008/0043938 A1    Feb. 21, 2008

(30) Foreign Application Priority Data

Aug. 21, 2006  (JP) ................................. 2006-224329
Aug. 21, 2006  (JP) ................................. 2006-224330
Aug. 21, 2006  (JP) ................................. 2006-224331

(51) Int. Cl.
H04M 1/64     (2006.01)
H04M 11/00    (2006.01)

(52) U.S. Cl.
USPC .................................... 379/88.22; 379/88.13

(58) Field of Classification Search
None
See application file for complete search history.

(56) References Cited

U.S. PATENT DOCUMENTS

| 5,835,789 | A | * | 11/1998 | Ueda et al. | 710/33 |
| 5,930,808 | A | * | 7/1999 | Yamanaka et al. | 715/205 |
| 6,553,410 | B2 | * | 4/2003 | Kikinis | 709/218 |
| 6,772,413 | B2 | * | 8/2004 | Kuznetsov | 717/136 |
| 7,054,952 | B1 | * | 5/2006 | Schwerdtfeger et al. | 709/246 |
| 7,139,626 | B2 | * | 11/2006 | Kataoka | 700/94 |
| 7,199,815 | B2 | * | 4/2007 | Aoyama | 348/14.01 |
| 7,412,484 | B1 | * | 8/2008 | Kikinis | 709/206 |
| 7,562,157 | B2 | * | 7/2009 | Kikinis | 709/246 |
| 7,685,247 | B2 | * | 3/2010 | Codignotto | 709/206 |
| 7,720,944 | B2 | * | 5/2010 | Thibault et al. | 709/222 |
| 2004/0073610 | A1 | | 4/2004 | Terada et al. | |
| 2008/0043938 | A1 | | 2/2008 | Yasuda | |

FOREIGN PATENT DOCUMENTS

| EP | 0982732 A1 | 3/2000 |
| JP | S62-274860 A | 11/1987 |
| JP | S63-187851 A | 8/1988 |
| JP | H02-170657 A | 7/1990 |
| JP | H09-130473 A | 5/1997 |
| JP | H09-284386 A | 10/1997 |

(Continued)

OTHER PUBLICATIONS

Japanese Patent Office, Notification of Reasons of Rejection for Application No. 2006-224329, dated Jun. 24, 2008 (counterpart to above-captioned patent application).

(Continued)

Primary Examiner — Joseph T Phan
(74) Attorney, Agent, or Firm — Baker Botts L.L.P.

(57) ABSTRACT

There is provided a communication device including a first communication unit configured to communicate with a first device having a telephone function through a first network; a second communication unit configured to communicate with a second device having a function of reproducing sound, through a second network; a data storage unit configured to store an incoming message as sound data; a sound data transmission unit configured to transmit the sound data to the second device in response to a request from the second device; a reproduction recordation unit configured to register the sound data which has been transmitted to the second device, as reproduced sound data; a reproduction judgment unit configured to judge whether the sound data is registered as reproduced sound data; and a sound data information transmission unit configured to transmit sound data information concerning the sound data judged not to be registered as reproduced sound data.

20 Claims, 29 Drawing Sheets

FOREIGN PATENT DOCUMENTS

| | | |
|---|---|---|
| JP | H11-122342 A | 4/1999 |
| JP | 2000-105598 A | 4/2000 |
| JP | 2000-278397 A | 10/2000 |
| JP | 2001-152364 A | 6/2001 |
| JP | 2001-236767 A | 8/2001 |
| JP | 2002-152364 A | 5/2002 |
| JP | 2002-535932 A | 10/2002 |
| JP | 2003-198763 A | 7/2003 |
| JP | 2004-128597 A | 4/2004 |
| JP | 2005-184326 A | 7/2005 |
| JP | 2008-048339 A | 2/2008 |
| JP | 2008-048340 A | 2/2008 |
| WO | 0044173 A1 | 7/2000 |

OTHER PUBLICATIONS

Japanese Patent Office, Notification of Reasons of Rejection for Application No. 2006-224330, dated Jun. 24, 2008 (counterpart to above-captioned patent application).

Japanese Patent Office, Notification of Reasons of Rejection for Application No. 2006-224331, dated Jun. 24, 2008 (counterpart to above-captioned patent application).

Japanese Patent Office, Notification of Reasons of Rejection for Japanese Patent Application No. 2006-224331, dispatched Sep. 16, 2008. (counterpart of above-captioned U.S. patent application).

* cited by examiner

\<Audio FOLDER\>
− \<MUSIC DATA FOLDER\>
MUSIC1 . MP3
MUSIC2 . MP3
•
•
•
MUSICl . MP3

− \<ANSWERPHONE DATA FOLDER\>
TEL1 . ADPCM
TEL2 . ADPCM
•
•
•
TELm . ADPCM

\<Image FOLDER\>
PHOTO1 . JPEG
PHOTO2 . JPEG
•
•
•
PHOTOn . JPEG

\<Video FOLDER\>
VIDEO1 . MPEG
VIDEO2 . MPEG
•
•
•
VIDEOo . MPEG

FIG. 4

```
<Audio FOLDER>
 — <MUSIC DATA FOLDER>
 MUSIC1 . MP3
 MUSIC2 . MP3
   •
   •
   •
 MUSICl . MP3

— <ANSWERPHONE DATA FOLDER>
 TEL1 . MP3
 TEL2 . MP3
   •
   •
   •
 TELm . MP3

<Image FOLDER>
 PHOTO1 . JPEG
 PHOTO2 . JPEG
   •
   •
   •
 PHOTOn . JPEG

<Video FOLDER>
 VIDEO1 . MPEG
 VIDEO2 . MPEG
   •
   •
   •
 VIDEOo . MPEG
```

FIG. 7

```
<Audio FOLDER>
— <MUSIC DATA FOLDER>
MUSIC1 . MP3
MUSIC2 . MP3
    •
    •
    •
MUSICl . MP3

— <ANSWERPHONE DATA FOLDER>
TEL1 . ADPCM
TEL2 . ADPCM
    •
    •
    •
TELm . ADPCM

TEL1 . MP3
TEL2 . MP3
    •
    •
    •
TEL3 . MP3

<Image FOLDER>
PHOTO1 . JPEG
PHOTO2 . JPEG
    •
    •
    •
PHOTOn . JPEG

<Video FOLDER>
VIDEO1 . MPEG
VIDEO2 . MPEG
    •
    •
    •
VIDEOo . MPEG
```

FIG.10

| | DLNA DEVICE #1 RECORDED MESSAGE "NOT LISTENED"/ "LISTENED" FLAG | DLNA DEVICE #2 RECORDED MESSAGE "NOT LISTENED"/ "LISTENED" FLAG | DLNA DEVICE #3 RECORDED MESSAGE "NOT LISTENED"/ "LISTENED" FLAG |
|---|---|---|---|
| <Audio FOLDER> | < > | < > | < > |
| – <MUSIC DATA FOLDER> | – < > | – < > | – < > |
| MUSIC1 . MP3 | . | . | . |
| MUSIC2 . MP3 | . | . | . |
| . | . | . | . |
| . | . | . | . |
| . | . | . | . |
| MUSICl . MP3 | . | . | . |
| | | | |
| – <ANSWERPHONE DATA FOLDER> | – < > | – < > | – < > |
| TEL1 . ADPCM | "NOT LISTENED" | "NOT LISTENED" | "LISTENED" |
| TEL2 . ADPCM | "NOT LISTENED" | "LISTENED" | "NOT LISTENED" |
| . | . | . | . |
| . | . | . | . |
| . | . | . | . |
| TELm . ADPCM | "LISTENED" | "NOT LISTENED" | "NOT LISTENED" |
| | | | |
| <Image FOLDER> | < > | < > | < > |
| PHOTO1 . JPEG | . | . | . |
| PHOTO2 . JPEG | . | . | . |
| . | . | . | . |
| . | . | . | . |
| . | . | . | . |
| PHOTOn . JPEG | . | . | . |
| | | | |
| <Video FOLDER> | < > | < > | < > |
| VIDEO1 . MPEG | . | . | . |
| VIDEO2 . MPEG | . | . | . |
| . | . | . | . |
| . | . | . | . |
| . | . | . | . |
| VIDEOo . MPEG | . | . | . |

FIG.27

```
<Audio FOLDER>
— <MUSIC DATA FOLDER>
MUSIC1 . MP3
MUSIC2 . MP3
   •
   •
MUSICl . MP3

— <ANSWERPHONE DATA FOLDER>
TEL1 . ADPCM
TEL1 . JPEG
TEL2 . ADPCM
TEL2 . JPEG
   •
   •
TELm . ADPCM
TELm . JPEG

<Image FOLDER>
PHOTO1 . JPEG
PHOTO2 . JPEG
   •
   •
PHOTOn . JPEG

<Video FOLDER>
VIDEO1 . MPEG
VIDEO2 . MPEG
   •
   •
VIDEOo . MPEG
```

FIG.30

```
<Audio FOLDER>
— <MUSIC DATA FOLDER>
MUSIC1 . MP3
MUSIC2 . MP3
   •
   •
   •
MUSICl . MP3

— <ANSWERPHONE DATA FOLDER>
TEL1+DATA+TIME+NUMBER . ADPCM
TEL1 . ADPCM
TEL1 . JPEG
TEL2+DATA+TIME+NUMBER . ADPCM
TEL2 . ADPCM
TEL2 . JPEG
   •
   •
   •
TELm+DATA+TIME+NUMBER . ADPCM
TELm . ADPCM
TELm . JPEG

<Image FOLDER>
PHOTO1 . JPEG
PHOTO2 . JPEG
   •
   •
   •
PHOTOn . JPEG

<Video FOLDER>
VIDEO1 . MPEG
VIDEO2 . MPEG
   •
   •
   •
VIDEOo . MPEG
```

FIG.33

```
<Audio FOLDER>
 — <MUSIC DATA FOLDER>
MUSIC1 . MP3
MUSIC2 . MP3
    •
    •
    •
MUSICl . MP3

— <ANSWERPHONE DATA FOLDER>
TEL1 . ADPCM
TEL2 . ADPCM
    •
    •
    •
TELm . ADPCM

<Image FOLDER>
PHOTO1 . JPEG
PHOTO2 . JPEG
    •
    •
    •
PHOTOn . JPEG

<Video FOLDER>
VIDEO1 . MPEG
VIDEO2 . MPEG
    •
    •
    •
VIDEOo . MPEG

— <RECORDED MESSAGE Video FOLDER>
TEL1 . MPEG
TEL2 . MPEG
    •
    •
    •
TELp . MPEG — <TV TELEPHONE FOLDER>
VIDEO-TEL1 . MPEG
VIDEO-TEL2 . MPEG
    •
    •
    •
VIDEO-TELq . MPEG
```

FIG.36

COMMUNICATION DEVICE

CROSS-REFERENCE TO RELATED APPLICATION

This application claims priority under 35 U.S.C. §119 from Japanese Patent Applications Nos. 2006-224329, filed on Aug. 21, 2006, 2006-224330, filed on Aug. 21, 2006, and 2006-224331, filed on Aug. 21, 2006. The entire subject matter of the application is incorporated herein by reference.

BACKGROUND

1. Technical Field

Aspects of the present invention relate to a communication device having a function of recording incoming messages.

2. Related Art

Communication devices having a function of recording incoming messages have been widely used. Such a communication device is used in a network system in which a client having a function of reproducing contents such as moving images, still images and sound data, is connected to the communication device functioning as a server for proving the contents to the client. An example of such a communication device is disclosed in Japanese Patent Provisional Publication No. 2004-128597A (hereafter, referred to as JP2004-128597A).

An example of such a communication device is a device having a telephone function and an automatic telephone message recorder function. The device having a telephone function is able to record incoming messages transmitted from a sending device when a call arrives during user's absence. Therefore, the above mentioned communication device has a drawback that it is not able to provide usability because the communication device only provide the recorded incoming message which is recording without considering the reproducing function of the client. Therefore, there may be a case where the client which has received the incoming message from the communication device is not able to reproduce the received incoming message.

SUMMARY

Aspects of the present invention are advantageous in that a communication device enabling a communication system in which the communication device is included to have excellent usability concerning providing of contents such as incoming messages from the communication device to a client.

According to an aspect of the invention, there is provided a communication device, which comprises a first communication unit configured to communicate with a first device having a telephone function, through a first network; a second communication unit configured to communicate with a second device having a function of reproducing sound through a second network; a data storage unit configured to store an incoming message from the first device as sound data having a first data format which the second device does not support; a conversion unit configured to convert the sound data having the first data format to sound data having a second data format which the second device supports; and a sound data transmission unit configured to transmit the sound data having the second data format converted by the conversion unit to the second device through the second interface.

According to the above mentioned configuration of the communication system, the sound data which the second device supports can be provided for the second device. Therefore, the second device is able to reproduce the sound data transmitted from the communication device. Such a configuration enables a user to reproduce the incoming message from a desired device. Consequently, usability concerning the reproduction of incoming messages can be enhanced.

According to another aspect of the invention, there is provided a communication device, which comprises a first communication unit configured to communicate with a first device having a telephone function through a first network; a second communication unit configured to communicate with a second device having a function of reproducing sound, through a second network; a data storage unit configured to store an incoming message from the first device as sound data; a sound data transmission unit configured to transmit the sound data to the second device in response to a request from the second device, a reproduction recordation unit configured to register the sound data which has been transmitted to the second device by the sound data transmission unit, as reproduced sound data; a reproduction judgment unit configured to judge whether the sound data stored in the data storage unit is registered as reproduced sound data by the reproduction recordation unit; and a sound data information transmission unit configured to generate sound data information concerning the sound data judged not to be registered as reproduced sound data by the reproduction judgment unit, and to transmit the sound data information to the second device.

Since the sound data information concerning the sound data judged not to be registered as reproduced sound data is transmitted to the second device, the second device is able to represent only the incoming messages which have not been reproduced by the user. Therefore, user is able to know incoming messages which the user have not listened to. Consequently, usability concerning the reproduction of incoming messages can be enhanced.

According to another aspect of the invention, there is provided a communication device, which comprises a first communication unit configured to communicate with a first device having a telephone function through a first network; a second communication unit configured to communicate with a second device having a function of reproducing sound, through a second network; a data storage unit configured to store sound data transmitted from the first device; a sound data transmission unit configured to transmit the sound data to the second device in response to a request from the second device; a reproduction recordation unit configured to register the sound data which has been transmitted to the second device by the sound data transmission unit, as reproduced sound data; a reproduction judgment unit configured to judge whether the sound data stored in the data storage unit is registered as reproduced sound data by the reproduction recordation unit; and a sound data information transmission unit configured to generate sound data information concerning the sound data stored in the data storage unit, and to transmit the sound data information to the second device. In this configuration, the sound data information transmission unit generates the sound data information such that the sound data information includes information enabling the second device to provide the sound data judged not to be registered as reproduced sound data by the reproduction judgment unit and the sound data judged to be registered as reproduced sound data by the reproduction judgment unit in different forms.

Such a configuration enables the second device to provide the incoming message which has been reproduced and the incoming message which has not been reproduced in different forms. Therefore, the user is able to find out the incoming message which has not been reproduced on the second device. Consequently, usability concerning the reproduction of incoming messages can be enhanced.

According to another aspect of the invention, there is provided a communication device, which comprises a first communication unit configured to communicate with a first device having a telephone function through a first network; a second communication unit configured to communicate with a second device having a function of reproducing sound, through a second network; a time obtaining unit configured to obtain time information representing a time when an incoming message from the first device is received; a sound conversion unit configured to convert the time information to time indication sound data used to indicate the time information by voice; a data storage unit configured to store sound data corresponding to the incoming message and the time indication sound data converted by the sound conversion unit; and a sound data transmission unit configured to transmit the time indication sound data and the sound data corresponding to the incoming message stored in the data storage unit, to the second device.

Since the time indication sound data for indicating the reception time of the incoming message is provided for the second device, the second device is able to reproduce both of the incoming message and the reception time. That is, the reception time can be outputted by voice. Consequently, usability concerning the reproduction of incoming messages can be enhanced.

According to another aspect of the invention, there is provided a communication device, which comprises a first communication unit configured to communicate with a first device having a telephone function through a first network; a second communication unit configured to communicate with a second device having a function of reproducing sound, through a second network; a time obtaining unit configured to obtain time information representing a time when an incoming message from the first device is received; an image conversion unit configured to convert the time information to time indication image data used to indicate the time information through an image; a data storage unit configured to store sound data corresponding to the incoming message and the time indication image data converted by the image conversion unit; and a sound data transmission unit configured to transmit the time indication image data and the sound data corresponding to the incoming message stored in the data storage unit, to the second device.

Since the time indication image data for indicating the reception time of the incoming message is provided for the second device, the second device is able to indicate both of the incoming message and the reception time through an image. That is, the reception time can be outputted through an image. Consequently, usability concerning the reproduction of incoming messages can be enhanced.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 4 illustrates data folders in a storage unit of the MFP.

FIG. 7 illustrates an example of a list transmitted in the file list transfer process.

FIG. 10 shows an example of a file folder structure in a storage unit of an MFP according to the second embodiment.

FIG. 27 illustrates an example of a list listing message files provided by an MFP according to an eighth embodiment.

FIG. 30 illustrates data folders stored in a storage unit of the MFP according to the ninth embodiment.

FIG. 33 illustrates data folders stored in a storage unit of an MFP according to a tenth embodiment.

FIG. 36 illustrates an example of a folder structure stored in a storage unit of the MFP according to the eleventh embodiment.

DETAILED DESCRIPTION

Hereafter, embodiments according to the invention will be described with reference to the accompanying drawings.

First Embodiment

Figure 1:
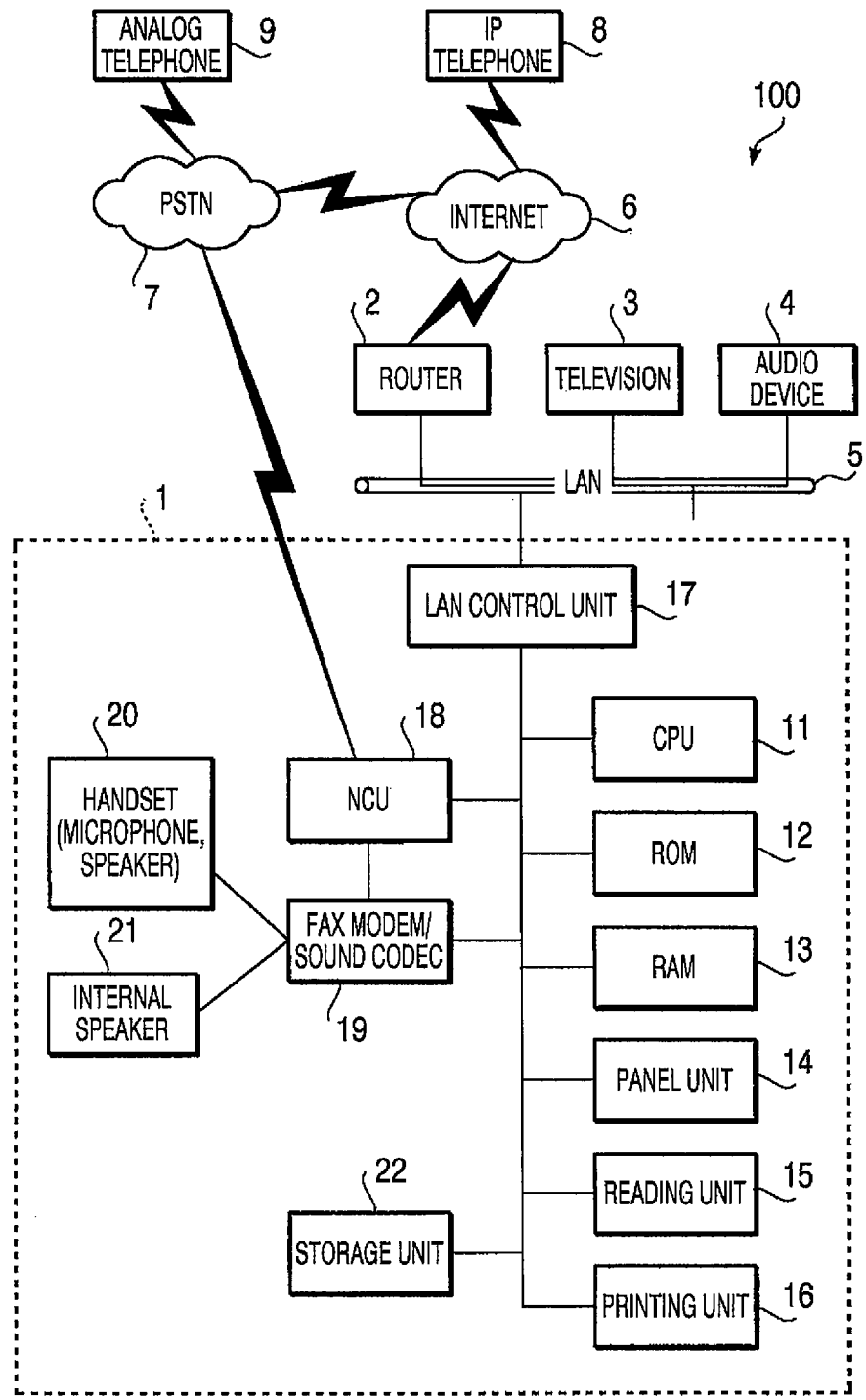
FIG. 1 is a block diagram of a communication system in which an MFP (Multi-Function Product) according to a first embodiment is included.

FIG. 1 is a block diagram of a communication system 100 in which an MFP (Multi-Function Product) 1 according to a first embodiment is included. As shown in FIG. 1, the communication system 100 includes the MFP 1, a router 2, a television 3, an audio device 4 which are commununicatably connected with each other via a LAN (Local Area Network) 5. The MFP 1 is connectable to the internet 6 via the router 2 and to a PSTN (Public Switched Telephone Network) via the router 2 and the internet 6.

The MFP 1 has a scanner function, a printing function, a copying function, a facsimile function, a telephone function, and a network communication function. The MFP 1 has, as telephone functions, an IP telephone function executed through the internet 6 and an analog telephone function executed through the PSTN 7. It should be noted that the MFP 1 may be configured to have only on of the IP telephone function and the analog telephone function. If the MFP 1 is configured not to have the analog telephone function, the MFP 1 may be unconnectable to the PSTN.

The router 2 has a function of relaying data from a network to another network. In this embodiment, the router 2 relays data between the LAN 5 and the internet 6. The television 3 has a function of outputting video and sound, and a network communication function. The audio device 4 has a function of outputting sound and a network communication function. The LAN 5 may include wire network based components (e.g., routers, hubs and cables) complying with IEEE802.3 standards (e.g., IEEE802.3 or IEEE802.3u) and wireless network based components (e.g., routers, hubs, and cables) complying with IEEE802.11 standards (e.g., IEEE802.11a, IEEE802.11b or IEEE802.11g). The LAN 5 may be configured only by the wire network based components or only by wireless network based components.

An analog telephone 9 is connected to the PSTN, and an IP telephone 8 is connected to the internet 6. Therefore, the MFP 1 is able to communicate with the analog telephone 9 and the IP telephone 8 through the internet 6 and the PSTN 7.

The internet 6 and the PSTN 7 are connected to each other via a gateway (not shown). Therefore, the MFP 1 is able to connect to the PSTN 7 via the internet 6 and communicate with the analog telephone 9 while the MFP 1 uses the IP telephone function. Further, the MFP 1 is able to connect to the interne 6 via the PSTN while the MFP uses the analog telephone function. Therefore, even if the MFP 1 is configured to have only one of the IP telephone function and the analog telephone function, the MFP is able to communicate with both of the IP telephone 8 and the analog telephone 9.

It should be noted that the internet 6 or the PSTN 7 may be connected to another networks, such as, a mobile phone network, so that the MFP 1 is able to communicate with a device (e.g., a mobile phone) on another network.

In the communication system 100, each of the MFP 1, the television 3 and the audio device 4 is configured to be a device complying with a DLNA® guideline (hereafter, referred to as a DLNA device). Under DLNA guideline, the DLNA device is able to serve as a server and as a player, and contents such as vide or sound are transmitted from a server to a player so that the player is able to reproduce the received contents. To achieve such functions, each of the DLNA devices in the communication system 100 is provided with network communication functions. In the communication system 100, a TCP/IP (Transmission Control Protocol Internet Protocol) is used to transmit information between a server and player, and a HU-E) (HyperText Transfer Protocol) is used to transfer messages or files between a server and a client.

The information or messages transmitted in the communication system 100 is described by XML (eXtensible Markup Language). Based on such information, control for synchronizing a still image with sound and synchronizing a text message with sound can be achieved on a client. Each DLNA device has a UPnP® (Universal Plug and Play) function. Therefore, when a DLNA device joins in the communication system 100, each of the DLNA devices including the newly added device is able to recognize the existence of all the other devices.

In this embodiment, the MFP 1 has both the server function and the player function based on the DLNA guideline. Each of the television 3 and the audio device 4 has the player function based on the DLNA guideline. Therefore, the television 3 is able to receive video and sound from the MFP 1 and to reproduce the received data. The audio device 4 is able to received sound data from the MFP 1 and to reproduce the received sound data.

Although the audio device 4 does not have the function reproducing video, the audio device 4 has a relatively small display on which text information is displayed. The displaying function of the audio device 4 is used when the audio device 4 receives a text message together with sound data from the MFP 1. The text message is then displayed on the display device of the audio device 4.

A configuration of the MFP 1 will now be described in detail. The MFP 1 includes a CPU 11, a ROM 12, a RAM 13, a panel unit 14, a reading unit 15, a printing unit 16, a LAN control unit 17, an NCU 18, a fax modem/sound codec 19, a handset 20, an internal speaker 21, and a storage unit 22. The CPU 11 controls internal components and functions of the MFP 1 in accordance with programs in the ROM 12. The ROM 12 stores programs and data necessary for achieving the functions of the MFP 1. The RAM 13 stores various types of data generated by the CPU 11. The panel unit 14 includes an input device (e.g., keys or touch panels) for inputting commands to the MFP 1, and a display device (e.g., a liquid crystal display) for outputting information.

The reading unit 15 reads an image from an original and functions, for example, when transmission of images for facsimile communication is required. The printing unit 16 prints out images on a recording medium, and functions, for example, when reception of images for facsimile communication or execution of the copying function is required. The LAN control unit 17 operates to communicate with devices (e.g., the television 3 or the audio device 4) on the LAN 5, and external devices on the internet 6.

The NCU 18 is used to perform telephone communication with an external telephone via the PSTN 7. It should be noted that the NCU 18 is not required if the MFP 1 has only the IP telephone function and does not have the analog telephone function.

The fax modem/sound codec 19 is use to transmit and receive a facsimile image via the PSTN 7. A sound CODEC provided in the fax modem/sound codec 19 supports the telephone function of the MFP 1. The sound CODEC of the fax modem/sound codec 19 is referred to as an internal sound CODEC hereinafter. More specifically, if the MFP 1 is provided with the IP telephone function, μ-Law CODEC or A-Law CODEC is employed by the MFP 1. If the MFP 1 is provided with the analog telephone function, an ADPCM CODEC is employed by the MFP 1.

In addition to the fax modem/sound codec 19, the MFP 1 has a software MP3 CODEC for processing sound data format of MP3 (MPEG Audio Layer-3). It should be noted that the function of the software MP3 CODEC may be implemented as a hardware in the MFP 1.

The handset 20 is used for telephone communication and includes a microphone and a speaker. The speaker 21 is used to output sound from the MFP 1 without using the speaker in the handset 20. The storage unit 22 is, for example, an HDD, and is able to store a large amount of data. It should be noted that if the capacity of the RAM 13 is sufficiently large, the storage unit 22 can be omitted.

Figure 2:
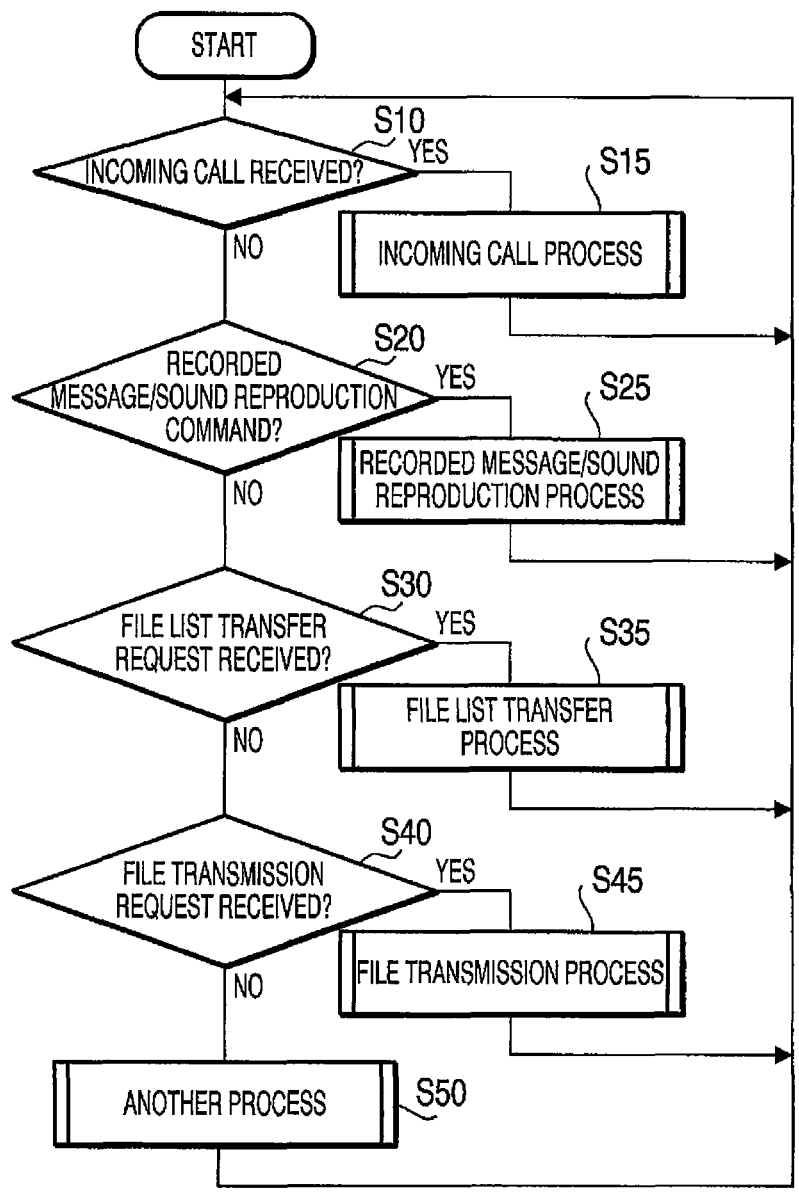
FIG. 2 is a flowchart illustrating a main process executed by MFP.

Operations of the MFP 1 will now be described with reference to FIG. 2. FIG. 2 is a flowchart illustrating a main process of the MFP 1 executed under control of the CPU 11 of the MFP 1. The main process is initiated when the MFP 1 is turned on, and thereafter the main process is executed repeatedly. When the main process is initiated, the MFP 1 judges whether there is an incoming call (step S10). If an incoming call is detected (S10: YES), the MFP 1 executes an incoming call process which is described in detail later (step S15). After the incoming call process is finished, control returns to step S10.

If an incoming call is not detected (S10: NO), the MFP 1 judges whether a command instructing the MFP 1 to reproduce messages recorded by the automatic telephone message recorder function or sound data (hereafter, referred to as a "recorded message/sound reproduction command") is inputted (step S20). If the recorded message/sound reproduction command is inputted by a user through use of the panel unit 14 (S20: YES), a recorded message/sound reproduction process is executed (step S25). The recorded message/sound reproduction process is described in detail later. After the recorded message/sound reproduction process is finished, control returns to step S10.

If the recorded message/sound reproduction command is not detected (S20: NO), the MFP 10 judges whether a file list transfer request is received (step S30). The file list transfer request is inputted to the television 3 or the audio device 4 through a user operation conducted on the television 3 or the audio device 4, and is transmitted to the MFP 1 from the television 3 or the audio device 4. If the file list transfer request is inputted (S30: YES), a file list transfer process is executed (step S35). The file list transfer process is described in detail later. After the file list transfer process is finished, control returns to step S10.

If the MFP 1 judges that the file list transfer list is not received (S30: NO), the MFP 1 judges whether a file transmission request is received (step S40). The file transmission request is inputted to the television 3 or the audio device 4 through a user operation conducted on the television 3 or the audio device 4, and is transmitted to the MFP 1 from the television 3 or the audio device 4. If the file transmission request is received (S40: YES), a file transmission process is executed (step S45). The file transmission process is described in detail later. After the file transmission process is finished, control returns to step S110.

If the MFP 1 judges that the file transmission request is not received (S40: NO), the MFP 1 executes another process. For example) a process related to the scanner function or the printing function is executed in step S50. After the process of step S50 is finished, control returns to step S10.

Although in the main process the above mentioned judgment processes S10, S20, S30 and S40 are executed repeatedly, the main process may be configured to execute control processes (S15, S25, S35, S45) as an interrupt process activated by occurrence of a corresponding event. For example, when as a receipt of an incoming call occurs in the MFP 1, the MFP 1 may initiate the incoming call process (S15) as an interrupt process.

Hereafter, the incoming call process executed in step S115 under control of the CPU 11 of the MFP 1 is explained with reference to FIG. 3. When the incoming call process is initiated, the MFP 1 judges whether the user answers an incoming call. More specifically, the MFP 1 judges that the user answers an incoming call if the MFP 1 judges that the handset 20 is picked up before a predetermined number of ringing signals is outputted (or before a predetermined time period elapses from the arrival of the incoming call) by detecting an on/off state of a hook switch (not shown) which switches depending on presence or absence of the handset 20 (S110: YES). The MFP 1 also judges that the user answers an incoming call if a user operation for executing voice communication without picking up the handset 20 is conducted (S110: YES).

If the predetermined number of ringing signals is outputted after the arrival of the incoming call (or a predetermined time period elapses from the arrival of the incoming call), the MFP 1 judges that the user does not answer the incoming call (S110: NO).

If the judgment result of step S110 is "YES", the MFP 1 executes a process for normal voice communication (step S115). More specifically, in step S115, a process for stopping output of ringing signals, a process for connecting the MFP 1 to an external telephone, and a process for disconnecting the MFP 1 from the external telephone in response to detection of termination of the voice communication are executed. After step S115 is finished, the incoming call process terminates.

If it is judged in step S110 that the user does not answer the incoming call (S110: "NO"), the MFP 1 reproduces a response message (step S120). That is, in step S120, the response message is transmitted to the external telephone. Next, the MFP 1 records sound representing a date of reception of the incoming call (step S125). As the date of reception, a date and time of reception of the incoming call is obtained from an internal timer (not shown) of the MFP 1. Then, voice reading aloud the date and time is produced and sound data representing the produced voice is stored in the RAM 13. The recordation of the reception date and time is thus finished.

Next, the MFP 1 judges whether a phone number of the sending party can be obtained (step S130). Regarding the analog telephone, the phone number of the calling party can be obtained by joining a caller number notification service provided by a telephone carrier (e.g., a number display® provided by NTT EAST or NTT WEST). Regarding the IP telephone, the number of the calling party can be obtained from a URI (Uniform Resource Identifier).

If the number of the calling party can be obtained (S130: YES), the MFP 1 records caller information (a name and a phone number of the calling party) (step S135). More specifically, regarding recordation of the phone number of the calling party, vice reading aloud the phone number of the calling party is produced. Regarding recordation of the name of the calling party, the MFP obtains the name of the calling party by searching address book data using the phone number of the calling party as a search key, and then voice reading aloud the searched name of the calling party is produced. Sound data produced as above is then recorded in the RAM 13.

After step S135 is processed or the MFP judges that the number of the calling party can not be obtained (S130: NO), control proceeds to step S140. In step S140, an incoming message sent from the external telephone is recorded. Then, the reception date and time recorded in step S125, the caller information recorded in step S135, and the incoming message recorded in step S1140 are stored in the storage unit 22 as a message for one call (step S145). Then, the incoming call process terminates.

Regarding the analog telephone, the message is stored in the storage unit 22 in the form of ADPCM format at step S145. Regarding the IP telephone, sound data (i.e., μ-Law format data or A-Law format data) from the external telephone is stored as it is at step S145 because the external telephone sends the μ-Law format data or A-Law format data to the MFP 1. The message is stored in an "answerphone data folder" prepared in the storage unit 22 as a file.

FIG. 4 illustrates data folders in the storage unit 22. As shown in FIG. 4, an "Audio folder", an "Image folder" and a "Video folder" are made in the storage init 22. In the "Audio folder", a "MUSIC data folder" and the "answerphone data folder" are made. In the "answerphone data folder", messages obtained in step S145 are stored in the form of a file name "a string "TEL"+a serial number extension". Since message files show in FIG. 4 have the extension of "ADPCM", it is understood that each of the message files is sound data encoded by ADPCM. As shown in FIG. 4, MP3 sound files, JPEG still images and MPEG moving images are stored in the "MUSIC data folder", "Image folder" and "Video folder", respectively. These files are stored in advance in the MFP 1 so that the MFP 1 can provide these files for a player (i.e., the television 3 and the audio device 4) when the MFP 1 serves as a server.

Figure 5:
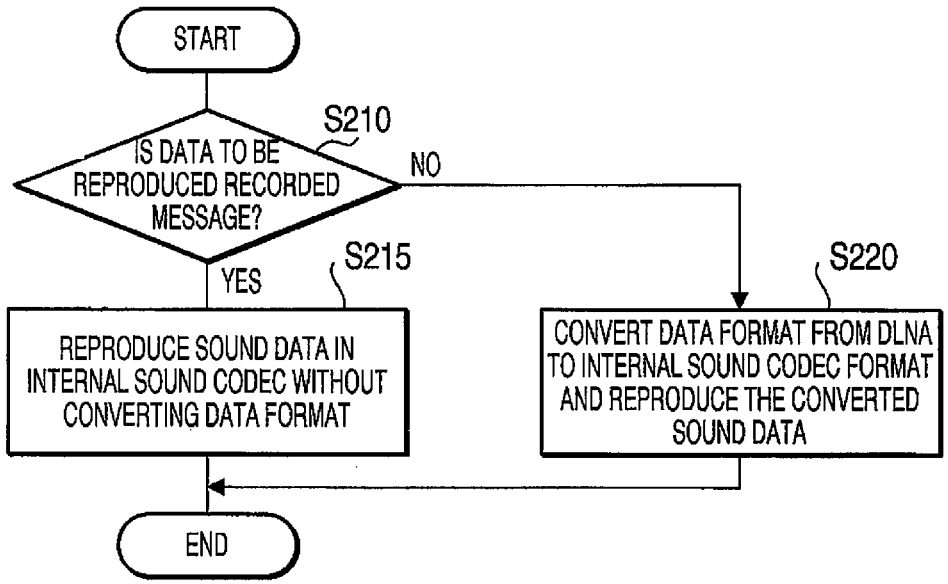
FIG. 5 is a recorded message/sound reproduction process executed in the main process.

Hereafter, the recorded message/sound reproduction process executed in step S25 under control of the CPU 11 of the MFP 1 is described with reference to FIG. 5. First, the MFP 1 judges whether data to be reproduced is the recorded message (step S210). Since whether data to be reproduced is the recorded message or sound data is inputted by the user as a user command through the panel unit 14, the MFP 1 makes a judgment in step S210 in accordance with the user operation.

If the MFP 1 judged that data to be reproduced is the recorded message (S210: YES), the MFP 1 reproduces the recorded message using the internal sound CODEC (i.e., the fax modem/sound codec 19) without changing the data format of the recorded message (step S215). Consequently, the user is able to listen to the recorded message outputted through the internal speaker 21.

If the MFP 1 judged that data to be reproduced is not the recorded message (S210: NO), the MFP 1 converts a data format of the sound data from a DLNA® format (e.g., a MP3 format) to a data format supported by the internal sound CODEC, and reproduces the converted sound data (step S220). Consequently, the user is able to listen to sound which is stored in advance in the MFP 1 and is outputted through the internal speaker 21 or the speaker in the handset 20. After step S215 or S220 is processed, the recorded message/sound reproduction process terminates.

Figure 6:
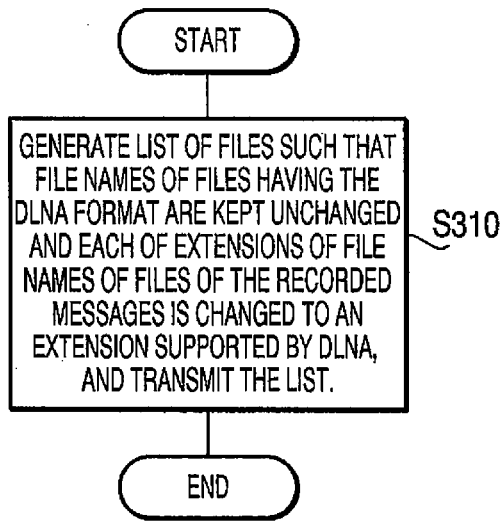
FIG. 6 is a flowchart illustrating a file list transfer process executed in the main process.

Hereafter, the file list transfer process executed in step S35 of the main process under control of the CPU 11 of the MFP 1 is described with reference to FIG. 6. When the file list transfer process is initiated, the MFP 1 generates a list of files stored in the folders such that file names of files having the DLNA® format are kept unchanged and each of extensions of file names of files of the recorded messages is changed to an extension supported by DLNA® (e.g., "MP3"). Then, the list is transmitted to a DLNA® device (step S310).

FIG. 7 illustrates an example of a list transmitted in step S310. As can be seen from FIG. 7, file names of files having extensions "MP3", "JPEG", and "MPEG" are kept unchanged, while file names of the files having the extension "ADPCM" are converted t have the extension "MP3".

For example, if the DLNA® device to which the list is transmitted is the television 3, the list shown in FIG. 7 is displayed on the television 3. Since the television 3 supports the DLNA® format but does not support the ADPCM format, the television 3 recognizes that the files having the extensions of "MP3", "JPEG" and "MPEG" are contents that can be reproduced, and that the files having the extension "ADPCM" are contents that can not be reproduced.

As described above, in the list, the file names of the files having the extension "ADPCM" are converted to have the extension "MP3". Therefore, the television 3 recognizes that the MFP 1 has the recorded massage of the MP3 format that the television 3 can reproduce. That is, in step S310, information indicating that the MFP 1 has recorded massages having the MP3 data format is notified to the television 3, although actually the MFP 1 does not have recorded messages having the MP3 data format. After step S310 is thus processed, the file list transfer process terminates.

Figure 8:
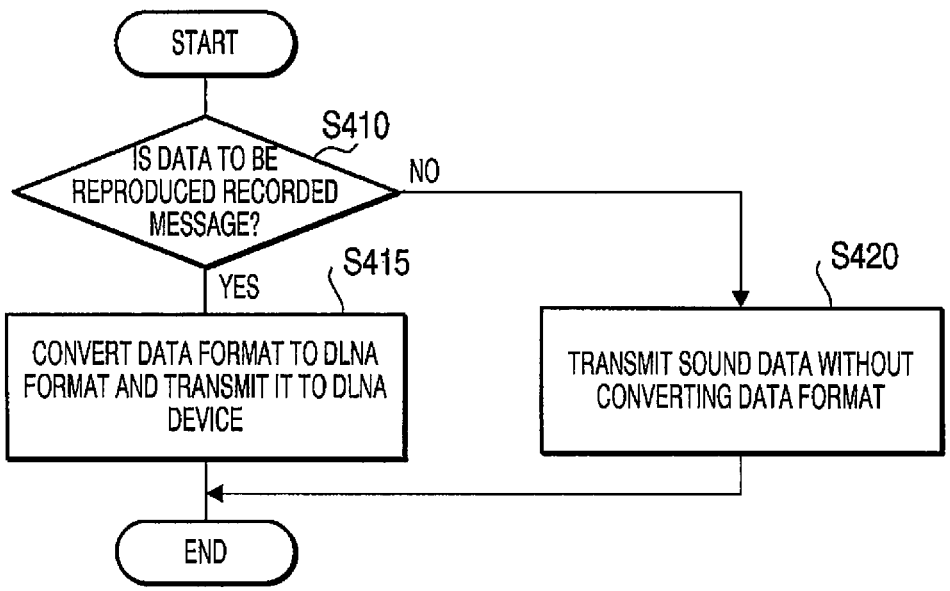
FIG. 8 is a flowchart illustrating a file transmission process executed in the main process.

Hereafter, the file transmission process executed in step S45 under control of the CPU 11 of the MFP 1 is described with reference to FIG. 8. When the file transmission process is initiated, the MFP 1 judges whether data to be transmitted is the recoded message (step S410). For example, the MFP 1 makes a judgment in step S410 in accordance with a file transmission request transmitted from the television 3 or the audio device 4. The television 3 transmits the file transmission request to the MFP 1 when the user conducts a user operation for selecting one of the files in the list displayed on the television 3. Since a file name which the television request to send is contained in the file transmission request, the MFP 1 is able to judge whether to transmit the recorded message based on the file name contained in the file transmission request.

It should be noted that since the user selected the file name through the screen displaying the list shown in FIG. 7, the file name of the selected file of the recorded message has the extension MP3.

If the MFP 1 judges that data to be transmitted is the recorded message (S410: YES), the MFP 1 converts the data format of the recorded message stored in the MFP 1 in the ADPCM format to the DLNA® format (e.g., MP3), and transmits the converted data to the DLNA® device (step S415).

If the MFP 1 judges that data to be transmitted is not the recorded message (S410: NO), the MFP 1 transmits the file having the DLNA format to the DLNA device without converting the data format of the file because in this case the data to be transmitted has the DLNA format. (step S420). After S415 or S420 is processed, the file transmission process terminates.

As described above, the incoming message from the IP telephone 8 or the analog telephone 9 is stored in the storage unit 22 as sound data having the internal sound CODEC (e.g., ADPCM, μ-Law or A-Law) which the television 3 and the audio device 4 is not able to reproduce. However, in step S415, the sound data of the internal sound CODEC format is converted to the sound data having the DLNA format, and thereafter the converted sound data is transmitted to the television 3 or the audio device 4.

Therefore, according to the embodiment, the television 3 or the audio device 4 is able to reproduce the recorded message transmitted from the MFP 1, in contrast to the case where a server transmits the sound data having the internal sound CODEC to the television 3 or the audio device 4 without converting the data format of the recorded message to the DLNA format.

As described above, since the MFP 1 converts the data format of the sound data having the internal sound CODEC to the DLNA format only after the file transmission request is received. That is, the MFP 1 converts the data format of the sound data having the internal sound CODEC to the DLNA format at the time when the MFP 1 transmits the requested file in step S415. Therefore, it becomes possible to prevent the MFP 1 from executing file conversion of the recorded message from the internal sound CODEC to the DLNA format regardless of the fact that whether the transmission request for the recorded message is transmitted from the television 3 or the audio device 4 is not clear. Execution of unnecessary file conversion can be prevented. Consequently, a processing load on the MFP 1 can be reduced and wasteful consumption of resources can be prevented.

As described above, the MFP 1 generates the list of files in the folders in the storage unit 22 while converting the file name of the file of the recorded massage to the file name of the DLNA format, and transmits the list to the television 3 or the audio device 4. Such a configuration makes it possible to cause the television 3 or the audio device 4 to recognize that sound data of the recorded message stored in the MFP 1 can be reproduced.

Such a configuration also makes it possible to allow the television 3 or the audio device 4 to select a file, for which the file transmission request is transmitted to the MFP 1, from the list. Then, the MFP 1 converts the data format of the file of the recorded message to the DLNA format in step S415. Such a configuration allows the MFP 1 to execute the file conversion only when a request is received from the television 3 or the audio device 4. There is no necessity to execute the file conversion as long as the request is not received.

Second Embodiment

Hereafter, an MFP according to a second embodiment is described. Since the MFP according to the second embodiment has the same hardware components as those of the MFP 1 according to the first embodiment and the configuration of the network system 100 according to the first embodiment can also be applied to the second embodiment, explanations of the second embodiment is made with reference to FIG. 1. In the following, only features of the second embodiment are explained.

Figure 9:
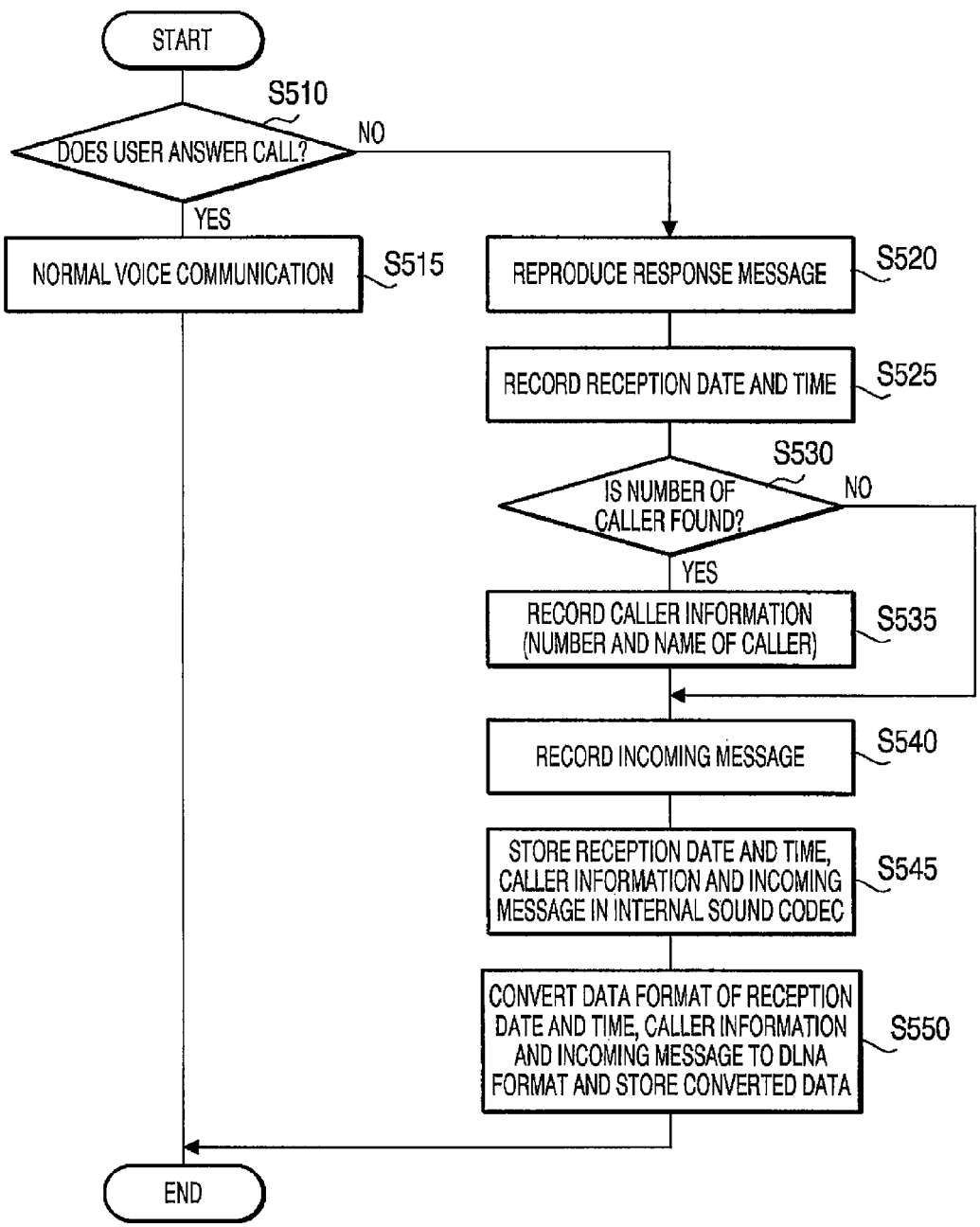
FIG. 9 is a flowchart illustrating an incoming call process according to a second embodiment.

FIG. 9 is a flowchart illustrating an incoming call process according to the second embodiment. The incoming call process shown in FIG. 9 is executed in place of step S15 of the main process shown in FIG. 2.

Figure 3:
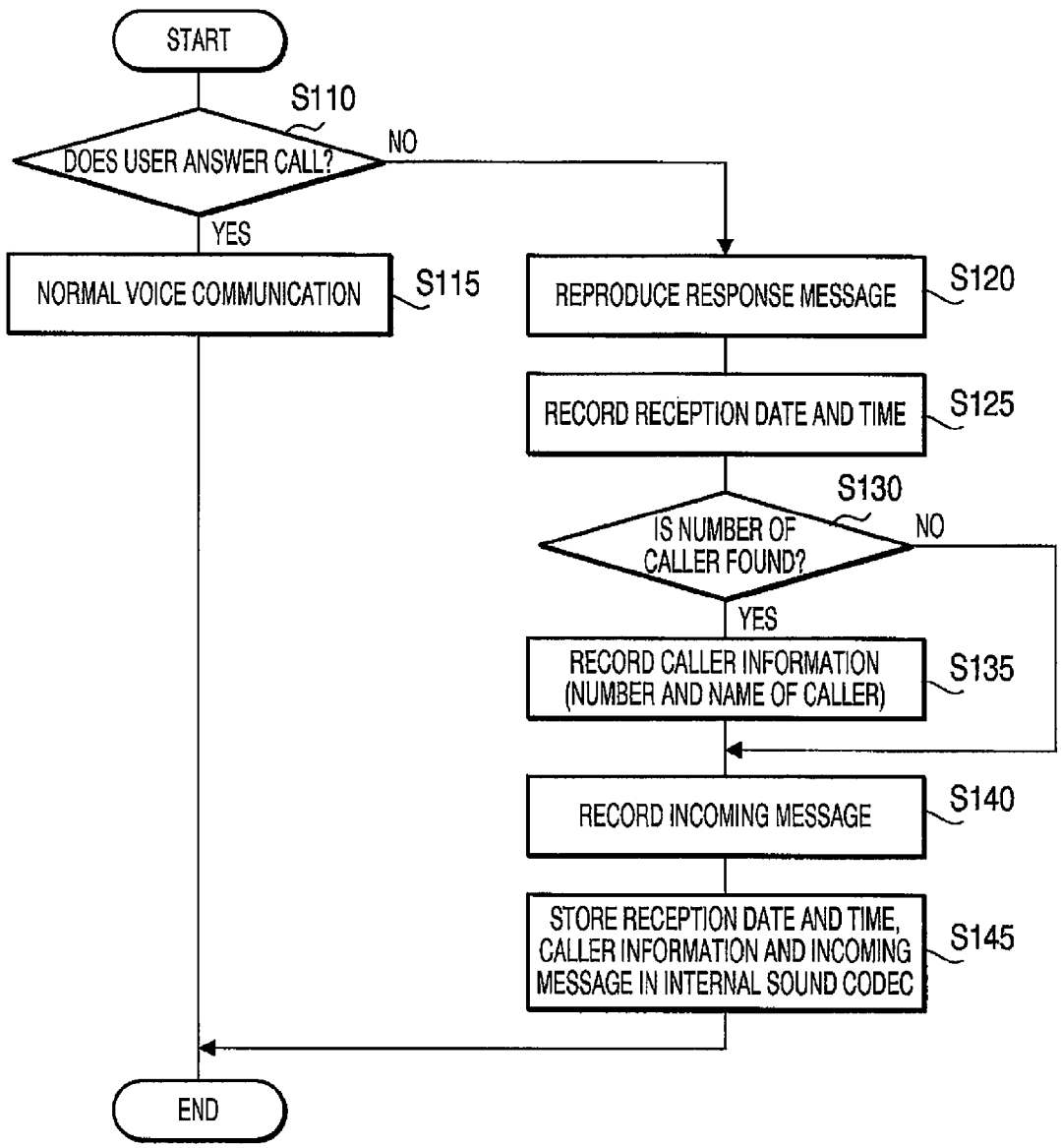
FIG. 3 is an incoming call process executed in the main process.

Since steps S510 to S545 are substantially the same as the steps S110 to S145 shown in FIG. 3, steps S510 to S545 are explained briefly. First, the MFP 1 judges whether the user answers an incoming call (step S510). If the MFP 1 judges that the user answers the incoming call (S510: YES), the MFP 1 executes a process for voice communication (step S515). Then, the incoming call process shown in FIG. 9 terminates.

If the MFP 1 judges that the user does not answer the incoming call (S510: NO), the MFP 1 reproduces a response message (step S520). Then, the MFP 1 records a reception date and time of the incoming call (step S525), and judges whether the number of the calling party can be obtained (step S530). If the number of the calling party can be obtained (S530: YES), the MFP 1 records caller information (step S535). Then, control proceeds to step S540.

In step S540, the MFP 1 records an incoming message transmitted from an external telephone. Then, the reception date and time recorded in step S525, the caller information recorded in step S535, and the incoming message recorded in step S540 are stored in the storage unit 22 as a message for one call (step S545).

After step S545 is processed, the reception date and time recorded in step S525, the caller information recorded in step S535, and the incoming message recorded in step S540 are converted to the DLNA format and the converted data is stored in the storage unit as a message for one call (step S550).

Similarly to the first embodiment, the message prepared in step S545 is stored in the "answerphone data folder" provided in the storage unit 22. The message prepared in step S550 is also stored in the "answerphone data folder" provided in the storage unit 22. FIG. 10 shows an example of a file folder structure in the storage unit 22. As shown in FIG. 10, an "Audio folder", an "Image folder" and a "Video folder" are made in the storage init 22. In the "Audio folder", a "MUSIC data folder" and the "answerphone data folder" are made.

In the "answerphone data folder", messages obtained in steps S545 and S550 are stored in the form of a file name "a string "TEL"+a serial number.extension". In this case, the file of the recorded message stored in step S545 is assigned the extension "ADPCM", while the file of the recorded message stored in step S550 is assigned the extension "MP3".

In summary, a recorded message is stored in the asnswerphone data folder as two files having the ADPCM format and the MP3 format.

Figure 11:
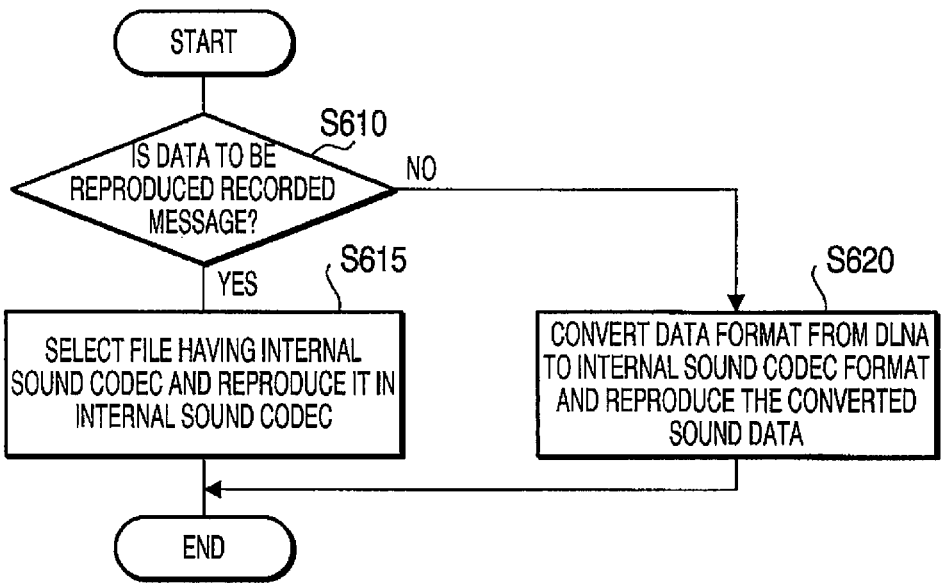
FIG. 11 is flowchart illustrating a recorded message/sound reproduction process according to the second embodiment.

Hereafter, a recorded message/sound reproduction process according to the second embodiment is described with reference to FIG. 11. The recorded message/sound reproduction process shown in FIG. 11 is executed under control of the CPU 11 of the MFP 1 in place of step S25 in the main process shown in FIG. 2.

First, the MFP 1 judges whether sound data to be reproduced is a recorded message in the same manner as that of step S210 (step S610). If sound data to be reproduced is a recorded message (S610: YES), the MFP 1 selects data having the internal sound CODEC from the two types of files corresponding to the sound data, and reproduces the selected sound data using the internal sound CODEC. Consequently, the user is able to listen to the recorded message through the internal speaker 21 or the speaker in the handset 20.

If the MFP 1 judges that the sound data to be reproduced is not a recorded message (S610: NO), the MFP 1 converts a data format of the sound data from a DLNA® format (e.g., a MP3 format) to a data format supported by the internal sound CODEC, and reproduces the converted sound data (step S620).

After step S615 or S620 is processed, the recorded message/sound reproduction process terminates. Since in the second embodiment a recorded message is stored as two types of files, the MFP 1 is able to select and reproduce a file having the internal sound CODEC format.

Figure 12:
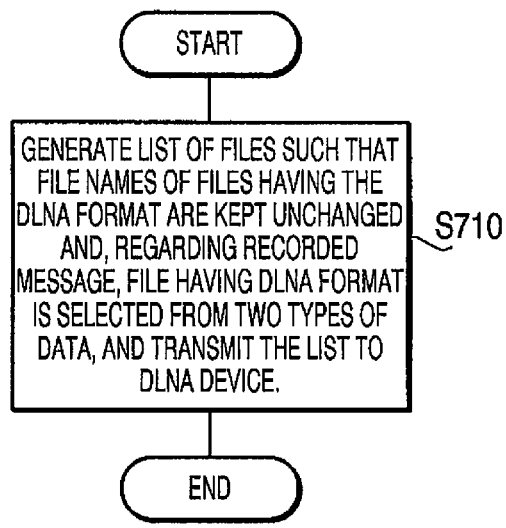
FIG. 12 is a flowchart illustrating a file list transfer process according to the second embodiment

Hereafter, a file list transfer process according to the second embodiment is described with reference to FIG. 12. The file list transfer process is executed under control of the CPU 11 of the MFP 1 in place of step S35 in the main process.

First, the MFP 1 generates a list of files stored in the folders such that file names of files having the DLNA® format are kept unchanged, and that each recorded message stored as two types of files, only one of the two types of files having the DLNA format is stored in the list. Then, the list is transmitted to a DLNA® device (step S710).

FIG. 7 is an example of a list transmitted in step S710. As can be seen from FIG. 7, file names of files having extensions "MP3", "JPEG", and "MPEG" are kept unchanged because these files correspond to the DLNA format. On the other hand, regarding each recorded message, only a file having the extension "MP3" is selected and only the file name of the selected MP3 file is stored in the list.

For example, if the DLNA® device to which the list is transmitted is the television 3, the list shown in FIG. 7 is displayed on the television 3. Since the television 3 supports the DLNA® format but does not support the ADPCM format, the television 3 recognizes that the files having the extensions of "MP3", "JPEG" and "MPEG" are contents that can be reproduced. After step S710 is processed, the file list transfer process terminates.

Figure 13:
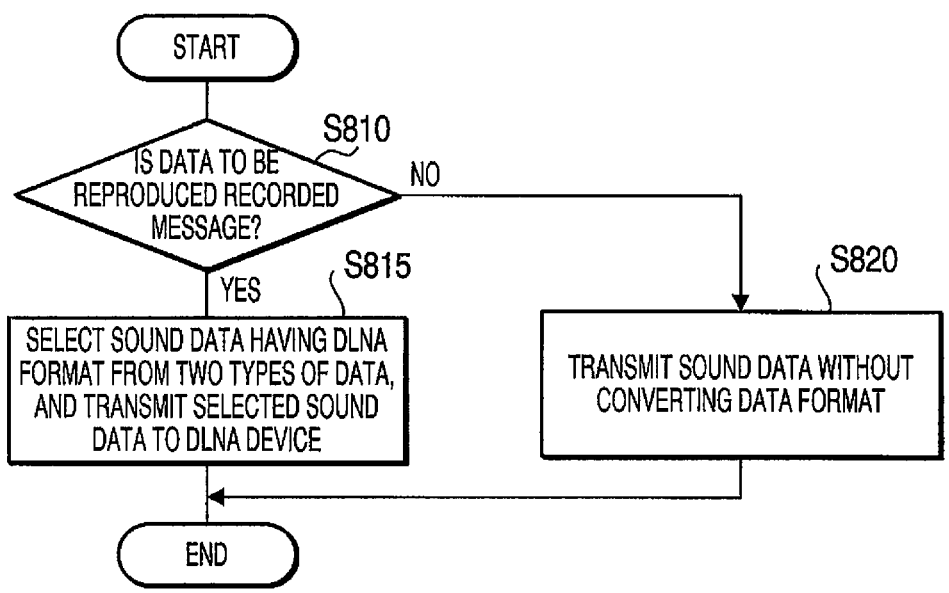
FIG. 13 is a flowchart illustrating a file transmission process according to the second embodiment.

Hereafter, a file transmission process according to the second embodiment is described with reference to FIG. 13. The file transmission process shown in FIG. 13 is executed under control of the CPU 11 of the MFP 1 in place of step S45 in the main process shown in FIG. 2.

First, the MFP 1 judges whether data to be transmitted is a recorded message in the same manner as that of step S410 (step S810). If the MFP 1 judges that the data to be transmitted is a recorded message (S810: YES), the MFP 1 selects a file having the DLNA format from the two types of files corresponding to the file, and transmits the selected file to the DLNA device (step S815).

If the MFP 1 judges that the data to be transmitted is not a recorded message (S810: NO), the MFP 1 transmits a file having the DLNA format to the DLNA device without converting the data format of the file because in this case the data to be transmitted has the DLNA format. (step S820). After S815 or S820 is processed, the file transmission process terminates.

As described above, the incoming message from the IP telephone 8 or the analog telephone 9 is stored in the storage unit 22 as sound data having the internal sound CODEC (e.g., ADPCM, μ-Law or A-Law) which the television 3 and the audio device 4 is not able to reproduce. However, the recorded message is additionally stored in the storage unit 22 as sound data having the DLNA format (e.g., MP3 format) in step S550 so that the sound data having the DLNA format can be transmitted to the television 3 or the audio device 4 in step S815.

Therefore, according to the embodiment, the television 3 or the audio device 4 is able to reproduce the recorded message transmitted from the MFP 1, in contrast to the case where a server transmits the sound data having the internal sound CODEC to the television 3 or the audio device 4 without converting the data format of the recorded message to the DLNA format.

According to the second embodiment, the MFP 1 stored an incoming message as sound data having the DLNA format in step S550 regardless of whether a transmission request has been received from the television 3 or the audio device 4. Such a configuration enables the MFP 1 to immediately transmit sound data having the DLNA format to the television 3 or the audio device 4.

Third Embodiment

Hereafter, an MFP according to a third embodiment is described. Since the MFP according to the third embodiment has the same hardware components as those of the MFP 1 according to the first embodiment and the configuration of the network system 100 according to the first embodiment can also be applied to the third embodiment explanations of the third embodiment is made with reference to FIG. 1. In the following, only features of the third embodiment are explained.

Figure 14:
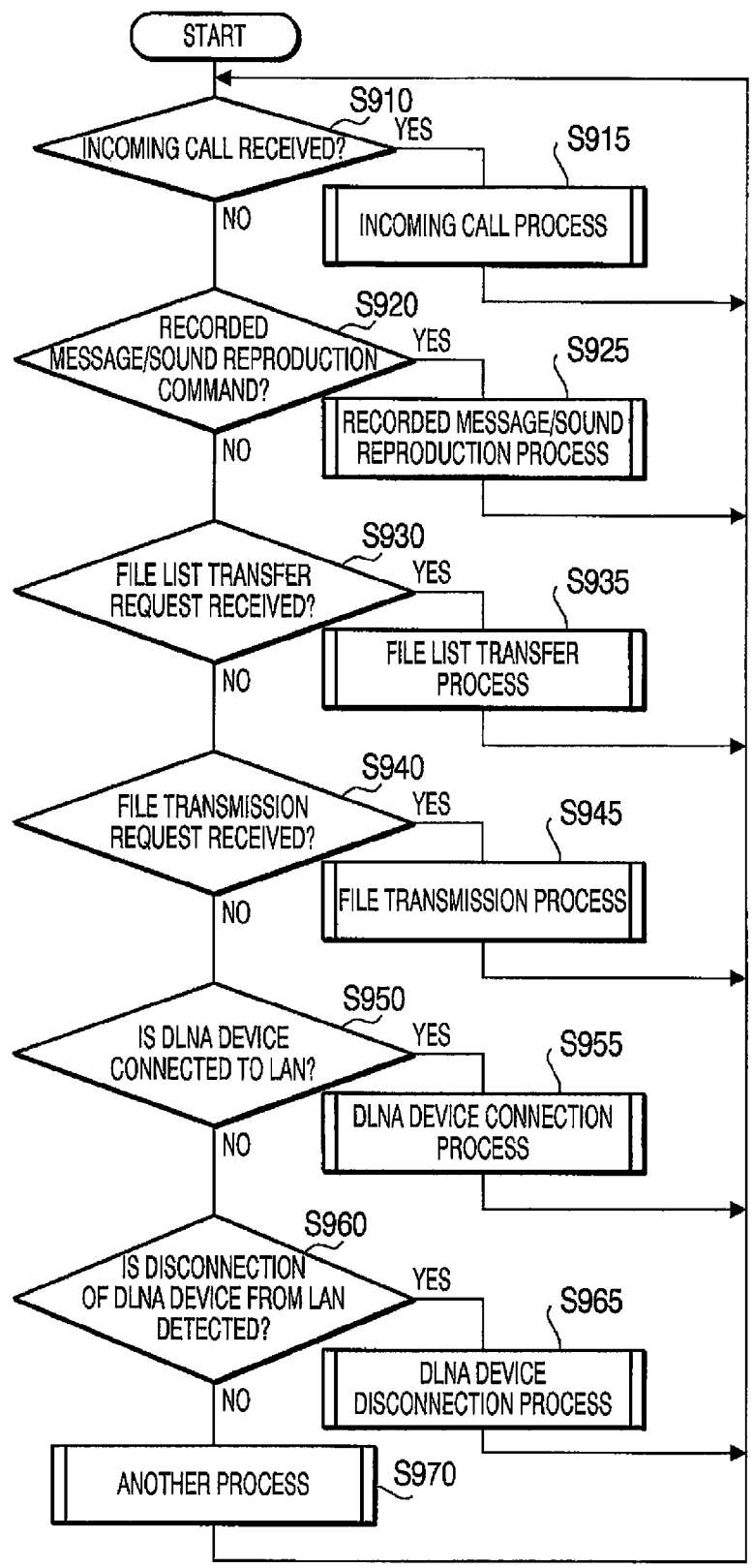
FIG. 14 is a flowchart illustrating a main process according to a third embodiment.

FIG. 14 is a flowchart illustrating a main process according to the third embodiment. The main process shown FIG. 14 is executed under control of the CPU 11 of the MFP 1. Since steps S910 to S945 and S970 in FIG. 14 are substantially the same as steps S10 to S45 and S50, respectively, in the main process shown in FIG. 2, steps S950 to S965 are explained in detail.

First the MFP 1 judges whether an incoming call is received (S910). If an incoming call from an external telephone is received (S910: YES), the MFP 1 executes an incoming call process (step S915). After step S915 is processed, control returns to step S910.

If the MFP 1 judges that no incoming call is received (S910: NO), control proceeds to step S920 where the MFP 1 judges whether the "recorded message/sound reproduction command" is inputted (step S920). If the recorded message/sound reproduction command is inputted by a user through use of the panel unit 14 (S920: YES), a recorded message/sound reproduction process is executed (step S925). After the recorded message/sound reproduction process is executed, control returns to step S910.

If the recorded message/sound reproduction command is not inputted (S920: NO), the MFP 1 judges whether a file list transfer request is received (step S930). The file list transfer request is inputted to the television 3 or the audio device 4 through a user operation conducted on the television 3 or the audio device 4, and is transmitted to the MFP 1 from the television 3 or the audio device 4. If the file list transfer request is inputted (S930: YES), a file list transfer process is executed (step S935). After the file list transfer process is finished, control returns to step S910.

If the MFP 1 judges that the file list transfer list is not received (S930: NO), the MFP 1 judges whether a file transmission request is received (step S940). The file transmission request is inputted to the television 3 or the audio device 4 through a user operation conducted on the television 3 or the audio device 4, and is transmitted to the MFP 1 from the television 3 or the audio device 4. If the file transmission request is received (step S940: YES), a file transmission process is executed (step S945). After the file transmission process is finished, control returns to step S910.

If the MFP 1 judges that no file transmission request is received (S940: NO), control proceeds to step S950 where the MFP 1 judges whether there is a DLNA device newly connected to the LAN 5 (step S950). Whether there is a DLNA device newly connected to the LA 5 can be detected through a Discovery command used under UPnP®. If a DLNA device can be detected (S950: YES), a DLNA device connection process which is explained in detail later is executed (step S955). After the DLNA device connection process is executed, control returns to step S910.

If it is judged in step S950 that no DLNA device is newly connected to the LAN 5 (S950: NO), the MFP 1 judges whether there is a device disconnected from the LAN 5 (step S60). Whether there is a device disconnected from the LA 5 can be detected through a Discovery command used under UPnP. If disconnected of a DLNA device from the LAN 5 is detected (S960: YES), a DLNA device disconnection process which is explained in detail later is executed (step S965). After the DLNA disconnection process is executed, control returns to step S910.

If it is judged in step S950 that no device is disconnected from the LAN 5 (S960: NO), the MFP 1 executes another process (S970). After step S910 is processed, control returns to step S910.

Although in the main process the above mentioned judgment processes S910, S920, S930 and S940 are executed repeatedly, the main process may be configured to execute control processes (S915, S925, S935, S945) as an interrupt process activated by occurrence of a corresponding event. For example, when as a receipt of an incoming call occurs in the MFP 1, the MFP 1 may initiate the incoming call process (S915) as an interrupt process.

Figure 15:
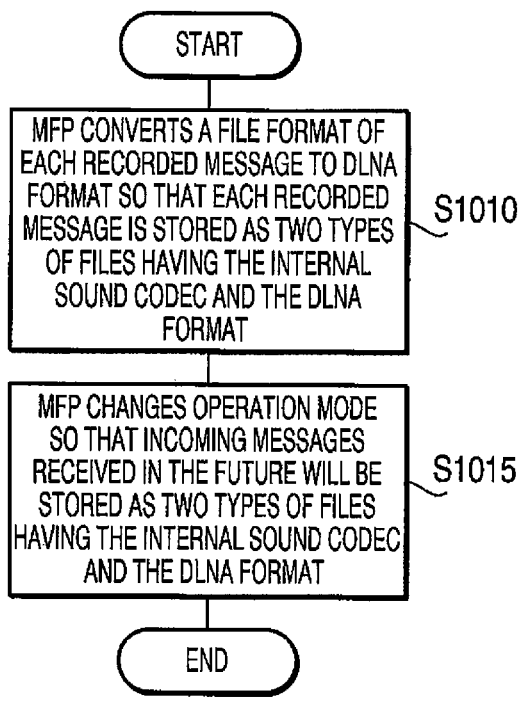
FIG. 15 is a flowchart illustrating a DLNA device connection process according to the third embodiment.

FIG. 15 is a flowchart illustrating the DLNA device connection process executed under control of the CPU 11 of the MFP 1. When the DLNA device connection process is initiated, the MFP 1 converts a file format of each recorded message having the internal sound CODEC to a DLNA format so that each recorded message is stored as two types of files having the internal sound CODEC and the DLNA format (step S1010).

Next, the MFP 1 changes an operation mode so that incoming messages received in the future will be stored as two types of files having the internal sound CODEC and the DLNA format (step S1015). It is understood that after step S1115 is processed, the MPF 1 stores a recorded message as two types of files having the internal sound CODEC and the DLNA format as in the case of the second embodiment. After step S1015 is processed, the DLNA device connection process terminates.

Figure 16:
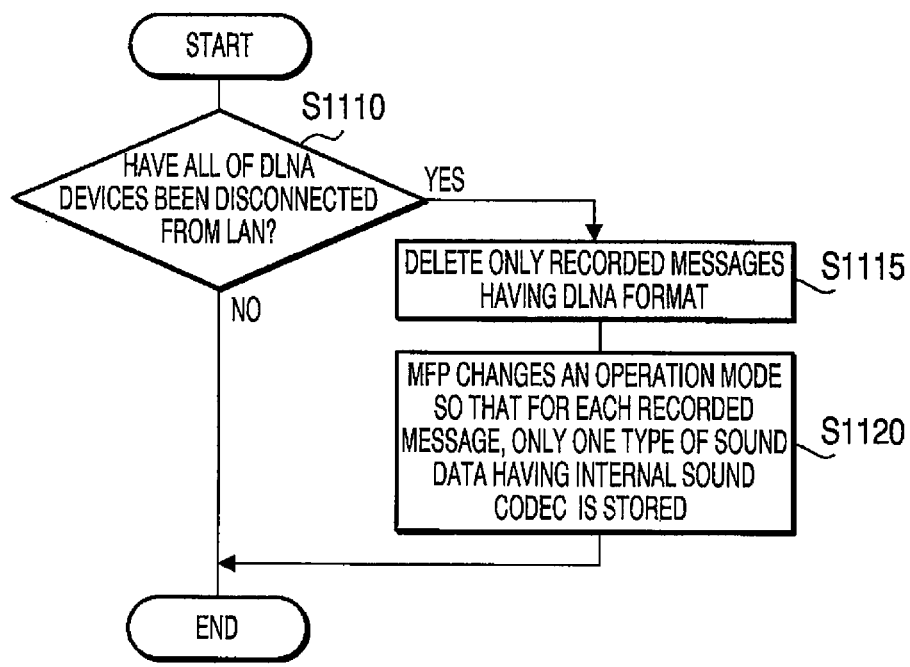
FIG. 16 is a flowchart illustrating a DLNA device disconnection process according to a third embodiment.

FIG. 16 is a flowchart illustrating the DLNA device disconnection process executed under control of the CPU 11 of the MFP 1. When the DLNA device disconnection process is initiated, the MFP 1 judges whether all of the DLNA deices are have been disconnected form the LAN 5 (step S1110). If at least one DLNA device is detected on the LAN 5, the MFP 1 judges that all of the DLNA deices have not been disconnected form the LAN 5 (S1110: NO). On the other hand, of not device is detected on the LAN 5, the MFP 1 judges that all of the DLNA devices have been disconnected from the LAN 5 (S110: YES).

If the judgment result of S110 is "YES", the MFP 1 deletes the recorded messages having the DLNA format (step S1115). That is, for each recorded message for which two types of files having the internal sound CODEC and the DLAN format are stored, the file having the DLNA format is deleted. After step S1120 is processed, the MFP 1 changes an operation mode so that for each recorded message, only one type of sound data having the internal sound CODEC is stored.

In summary, after step S1015 is processed, the MFP 1 operates to record an incoming message as two types of files having the internal sound CODEC and the DLNA format as in the case of the second embodiment. On the other hand, after step S1120 is processed, the MFP 1 operates to record an incoming message only as a file having the internal sound CODEC. After step S1120 is processed, the DLNA device disconnection process terminates. If the judgment result of step S1110 is "NO", the DLNA device disconnection process terminates.

As described above, if at least one DLNA device is connected to the LAN 5, the MFP 1 moves to a mode where an incoming message is recorded as two types of files having the internal sound CODEC and the DLNA format. On the other hand, if all of the DLNA devices are disconnected from the LAN 5, the MFP 1 moves to a state whether an incoming message is recorded only a file having the internal sound CODEC.

When the MFP 1 is in the mode where an incoming message is recorded as two types of files having the internal sound CODEC and the DLNA format, the same the incoming call process as that for the second embodiment is executed in step S915 and the same recorded message/sound reproduction process as that of the second embodiment is executed in step S925. When the MFP 1 is in the mode where an incoming message is recorded only in the internal sound format the same the incoming call process as that for the first embodiment is executed in step S915 and the same recorded message/sound reproduction process as that of the first embodiment is executed in step S925.

According to the third embodiment, when at least one DLNA device is connected to the LAN 5, the MFP 1 is moved, by steps S950 and S955, to the mode where an incoming message is recorded as two types of files having the internal sound CODEC and the DLNA format. Therefore, the same advantages as those of the second embodiment can also be achieved.

In addition, when the communication system 100 moves to the state where no DLNA device is connected to the LAN 5, the MFP 1 moves to the mode where an incoming message is recorded on in the internal sound CODEC format. Therefore, in this case, the MFP 1 is allowed to convert the format of the recorded message only when the television 3 or the audio device 4 is connected to the LAN 5. That is, it is not necessary for the MFP 1 to convert a file format of a recorded message as long as no DLNA device is connected to the LAN 5. Execution of unnecessary file conversion can be prevented. Consequently, a processing load on the MFP 1 can be reduced and wasteful consumption of resources can be prevented.

When all of the DLNA devices (e.g., the television 3 or the audio device 4) are disconnected from the LAN 5, recorded messages having the DLNA format deleted. Therefore, it becomes possible to prevent sound data having the DLNA format from staying wastefully in the MFP 1. Wasteful consumption of the storage unit 22 can be prevented.

Fourth Embodiment

Hereafter, an MFP according to a fourth embodiment is described. Since the MFP according to the fourth embodiment has the same hardware components as those of the MFP 1 according to the first embodiment and the configuration of the network system 100 according to the first embodiment can also be applied to the fourth embodiment, explanations of the fourth embodiment is made with reference to FIG. 1. In the following, only features of the fourth embodiment are explained.

As describe in detail below, the forth embodiment provides a file list transfer process different form those executed in step S35 in the first embodiment and in step S935 in the third embodiment. Further, the forth embodiment provides a file transmission process different from those executed in step S45 in the first embodiment or in step S945 in the third embodiment.

Figure 17:
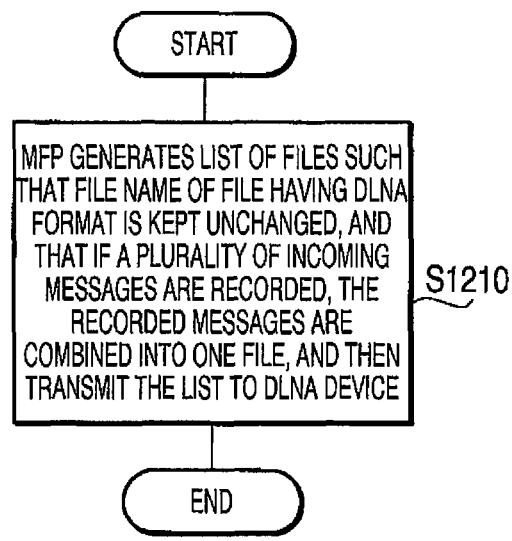
FIG. 17 is a flowchart illustrating a file list transfer process according to a fourth embodiment.

FIG. 17 is a flowchart illustrating the file list transfer process according to the fourth embodiment. The file list transfer process shown in FIG. 17 is executed under control of the CPU 11 of the MFP 1. The file list transfer process is executed in place of S35 or S945.

When the file list transfer process is executed, the MFP 1 generates a list of files such that a file name of the file having the DLNA format is kept unchanged, and that if a plurality of incoming messages are recorded, the recorded messages are combined into one file (step S1210). If the main process similar to that of the first embodiment is employed, the list is described such that recorded messages having the DLNA format exist although actually the incoming messages are recorded in the internal sound CODEC format. If the main process similar to that of the third embodiment is employed, two types of files having the internal sound CODEC format and the DLNA format are stored for each recorded message. Therefore, the list can be made referring to file names of files having the DLNA format. In each of these cases, if a plurality of recorded messages exist, these recorded messages are combined into one file.

The television 3 which received the list recognizes that only one file (recorded message) is stored in the MFP 1. After step S1120 is processed, the file list transfer process terminates.

Figure 18:
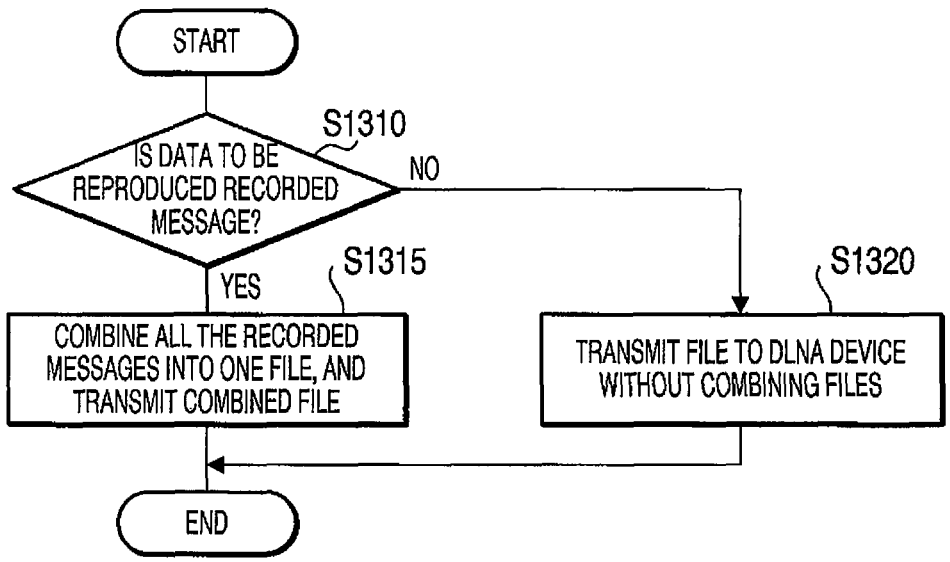
FIG. 18 is a flowchart illustrating a file transmission process according to a fourth embodiment.

FIG. 18 is a flowchart illustrating the file transmission process executed under control of the MFP 1. The file transmission process shown in FIG. 8 is executed in place of step S45 or S945.

When the file transmission process is initiated, the MFP 1 judges whether data to be transmitted is the recoded message (step S1310). Step S1310 is the same as step S410 or S810. If data to be transmitted is the recoded message (S1310: YES), the MFP 1 combines all of the recorded messages into one file, and transmits the one file to the DLNA device (step S1315). If only one recorded message exists, the MFP 1 transmits the one recorded message (one file) to the DLNA device.

If the main process similar to that of the first embodiment is employed, the MFP 1 converts file formats of all of the recorded messages to the DLNA formats and thereafter combines the converted messages into one file, or the MFP 1 combines the recorded messages having the internal sound CODEC into one file, and thereafter converts the file format of the combined file to the DLNA format. If the main process similar to the second embodiment or the third embodiment is employed, each incoming message is recorded as two types of files having the DLNA format and the internal sound CODEC format In this case, the MFP 1 combines the recorded messages having the DLNA format into one file. In each of these cases, the combined file is transmitted to the DLNA device.

If the MFP 1 judges that data to be transmitted is not the recorded message (S1310: NO), the MFP 1 transmits the designated DLNA file (e.g., a file having the extension "MP3", "JPEG", or "MPEG") to the DLNA device without combining a plurality of files (step S11320). After step S815 or S820 is processed, the file transmission process terminates.

According to the fourth embodiment, the same advantages as those of the first to third embodiment can be achieved.

Since a plurality of recorded messages are combined into one file, a user is allowed to easily start to reproduce one or more recorded messages without requesting the user to conduct a troublesome user operation for selecting a desired recorded message to be reproduced.

Fifth Embodiment

Hereafter, an MFP according to a fifth embodiment is described. Since the MFP according to the fifth embodiment has the same hardware components as those of the MFP 1 according to the first embodiment and the configuration of the network system 100 according to the first embodiment can also be applied to the fifth embodiment, explanations of the fifth embodiment is made with reference to FIG. 1. In the following, only features of the fifth embodiment are explained.

Figure 19:
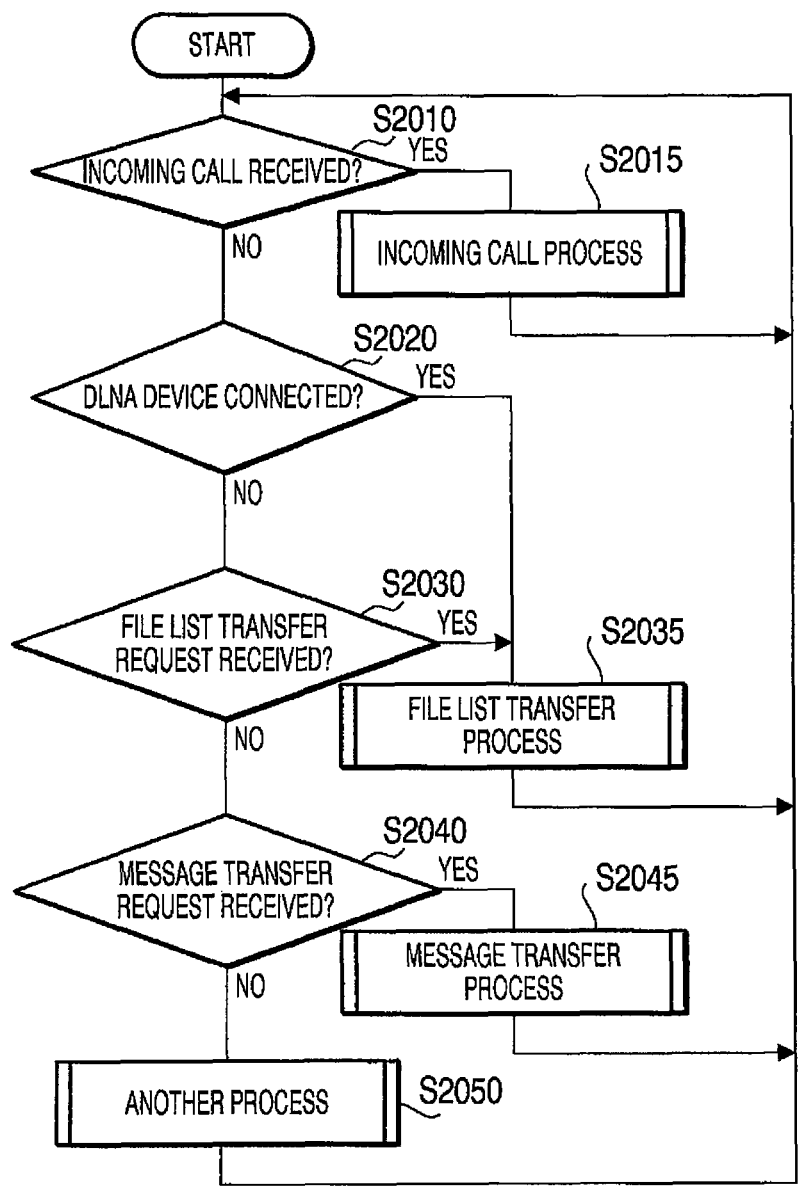
FIG. 19 is a flowchart illustrating a main process executed by an MFP according to a fifth embodiment.

FIG. 19 is a flowchart illustrating a main process executed under control of the CPU 11 of the MFP 1. The main process is executed repeatedly after the MFP 1 is started. When the main process is initiated, the MFP 1 judges whether an incoming call is received from an external telephone (step S2010). If an incoming call is received (S2010: YES), an incoming call process which is described in detail later is executed (step S2015). After step S2015 is processed, control returns to step S2010.

If the MFP 1 judges that no incoming call is received (S2010: NO), the MFP judges whether there is a DLNA device newly added to the LAN 5 (step S2020). Whether there is a device newly added to the LAN 5 can be detected through a Discovery command used under UPnP.

If the MFP 1 judges that there is no DLNA device newly connected to the LAN 5 (S2020: NO), the MFP 1 judges whether a file list transfer request is received (step S2030). The file list transfer request is inputted to the television 3 or the audio device 4 through a user operation conducted on the television 3 or the audio device 4, and is transmitted to the MFP 1 from the television 3 or the audio device 4.

If connection of a new DLNA device to the LAN 5 is detected (S2020: YES) or the file list transfer request is inputted (S2030: YES), a file list transfer process is executed (step S2035). The file list transfer process is described in detail later. After the file list transfer process is finished, control returns to step S2010.

If the MFP 1 judges that a file transfer request is not received (S2030: NO), the MFP 1 judges whether a message transfer request (a request for a message No. X) is received from a DLNA device (step S2040). The message transfer request is inputted to the television 3 or the audio device 4 through a user operation conducted on the television 3 or the audio device 4, and is transmitted to the MFP 1 from the television 3 or the audio device 4.

If the MFP 1 judges that a message transfer request is inputted (S2040: YES), control proceeds to step S2045 to execute a message transfer process (step S2045) which is described in detail later. After step S2045 is processed, control returns to step S2010.

If the MFP 1 judges that a message transfer request is not received (S2040: NO), the MFP 1 executes another process (step S2050). For example, a process related to the scanner function or the printing function is executed in step S2050. After the process of step S2050 is finished, control returns to step S2010.

Although in the main process the above mentioned judgment processes S2010, S2020, S2030 and S2040 are executed repeatedly, the main process may be configured to execute control processes (S2015, S2035, S2045) as an interrupt process activated by occurrence of a corresponding event.

Figure 20:
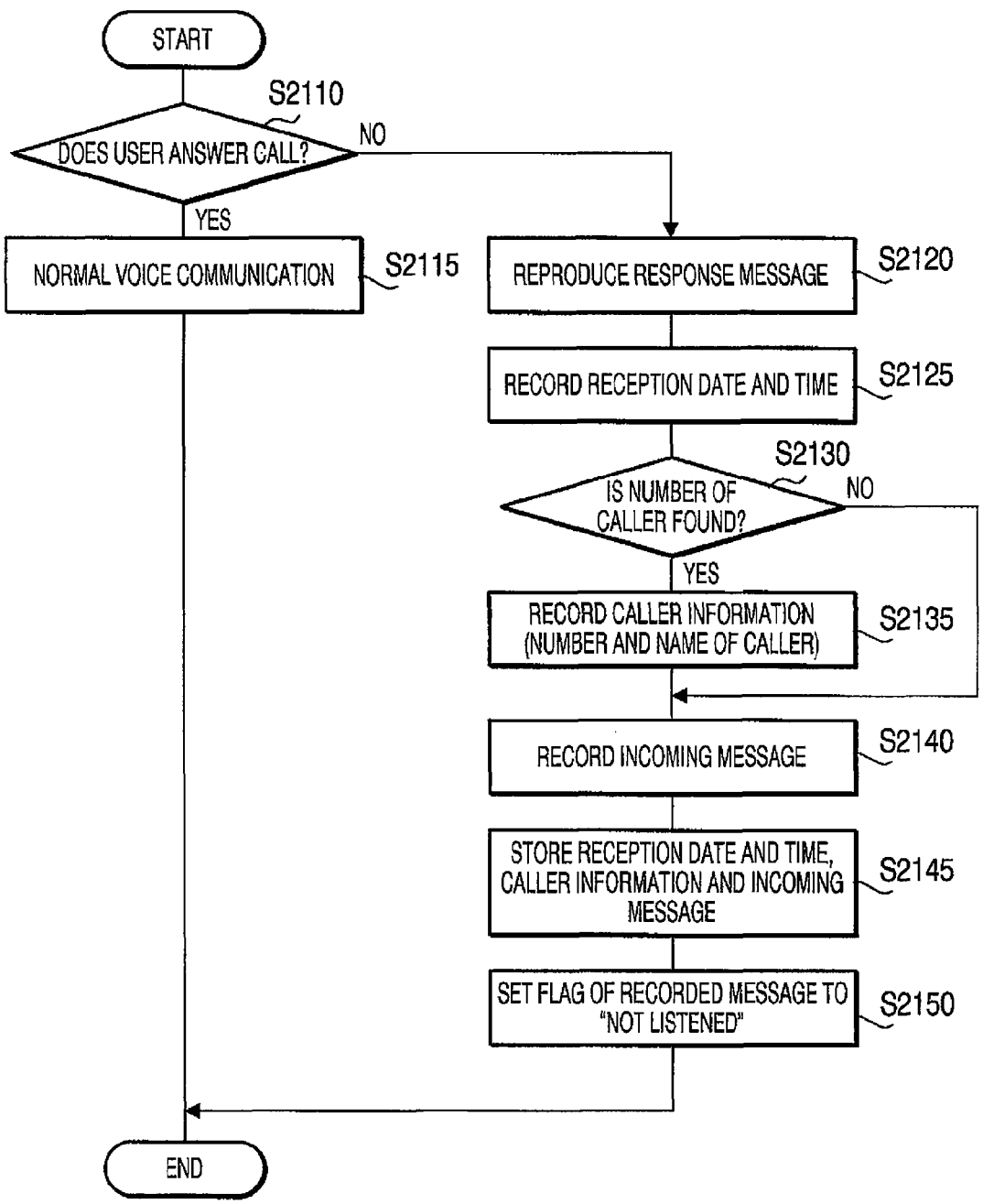
FIG. 20 is a flowchart illustrating an incoming call process according to the fifth embodiment.

FIG. 20 is a flowchart illustrating the incoming call process executed in step S2015 under control of the CPU 11 of the MFP 1. Since steps S2110, S2115, S2120, S2125, S2130, S2135, and S2140 are substantially the same as steps S110, S1115, S120, S125, S130 and S1140 of the main process according o the first embodiment, explanations thereof will not be repeated. Hereafter, only the feature of the main process according to the fifth embodiment is described.

After an incoming message is recorded in step S2140, the MFP 1 records a reception date and tome of the incoming message, the caller information obtained in step S135, and the incoming message obtained in step S140 in the storage unit 22 as a piece of information for one message (step S145).

Regarding an analog telephone, an incoming message is recorded in the storage unit 22 in the ADPCM format. Regarding an IP telephone, sound data in the μ-Law format or A-Law format is recorded because in this case sound data in the μ-Law format or A-Law format are transmitted from the IP telephone.

Figure 21:
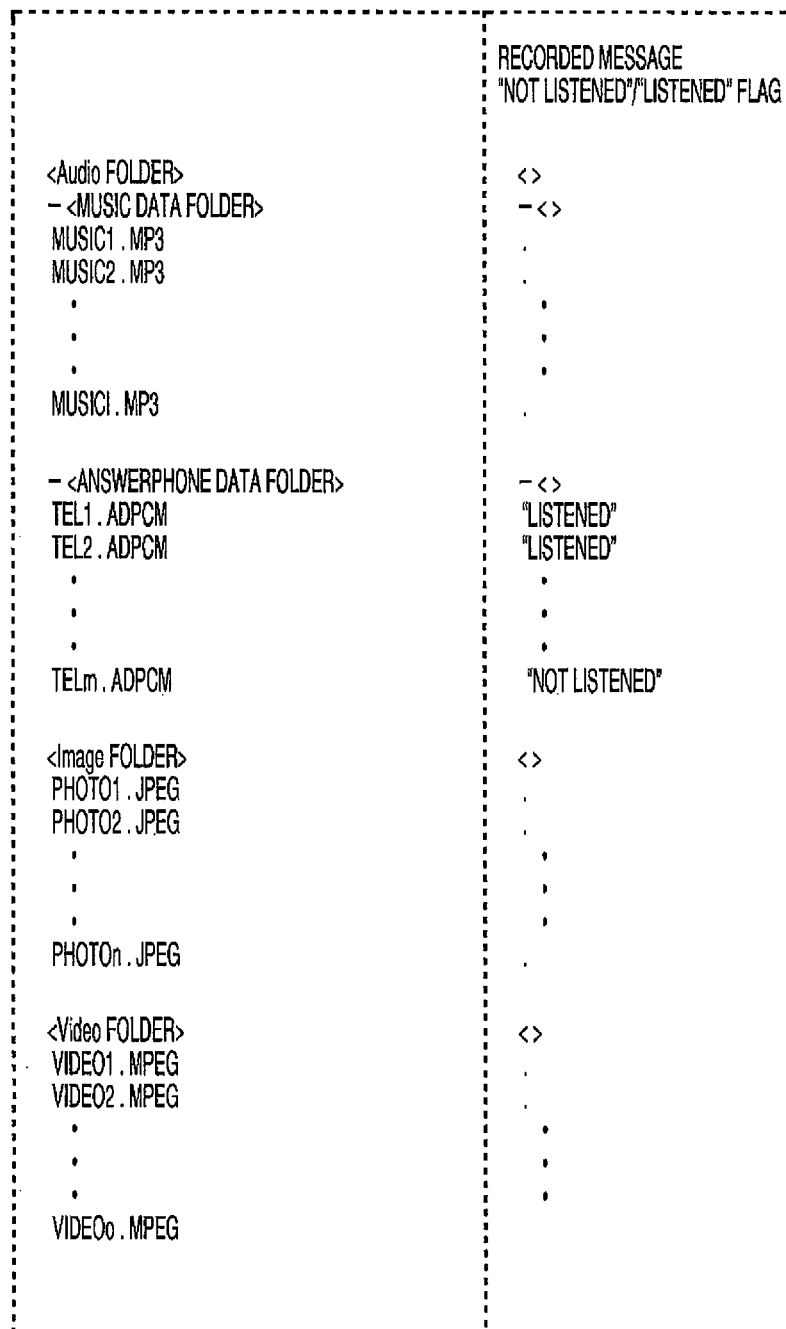
FIG. 21 illustrates data folders in a storage unit of the MFP according to the fifth embodiment.

FIG. 21 illustrates data folders in the storage unit 22. As shown in FIG. 21, an "Audio folder", an "Image folder" and a "Video folder" are made in the storage init 22. In the "Audio folder", a "MUSIC data folder" and the "answerphone data folder" are made. In the "answerphone data folder", messages obtained in step S2145 are stored in the form of a file name "a string "TEL"+a serial number extension". Since message files shown in FIG. 21 have the extension of "ADPCM", it is understood that each of the message files is sound data encoded by ADPCM. As shown in FIG. 4, MP3 sound files, JPEG still images and MPEG moving images are stored in the "MUSIC data folder", "Image folder" and "Video folder", respectively. These files are stored in advance in the MFP 1 so that the MFP 1 can provide these files for a player (i.e., the television 3 and the audio device 4) when the MFP 1 serves as a server.

As shown in FIG. 21, a flag is assigned to each recorded message file. The data representing flags assigned to recorded messages may be stored in the storage unit 22. "Listened" of the flag means that the recorded message has been already listened to, while "Not Listened" means that the recorded message has not been listened to yet.

After the incoming message is recorded in step S145, the flag corresponding to the newly recorded message is set to "Listened" (step S2150). Then, the incoming call process terminates. It is understood various types of data can be used as a flag representing whether a recorded message has been listened to or not.

Figure 22:
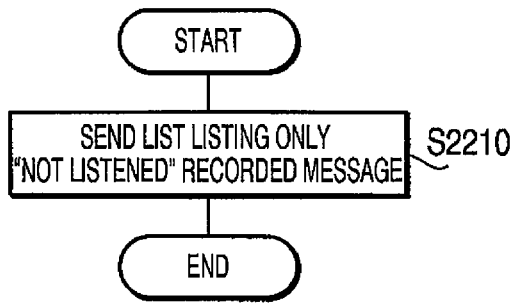
FIG. 22 is a flowchart illustrating a file list transfer process according to the fifth embodiment.

FIG. 22 is a flowchart illustrating the file list transfer process executed in step S2035 under control of the CPU 11 of the MFP 1. When the file list transfer process is initiated, the MFP 1 selects message files having the flag "Not Listened" and generates a list listing the selected message files. Then, the MFP 1 transmits the list to the DLNA device (step S2210). Since the list contains only the recorded messages which have not been listened to, the DLNA device is able to handle only message files which have not been listened to as selectable files. After step S2210 is processed, the file list transfer process terminates.

Figure 23:
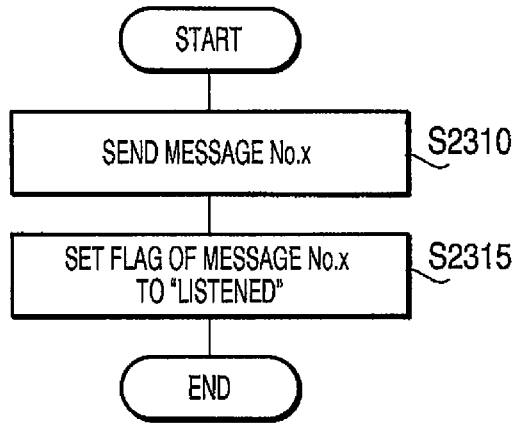
FIG. 23 is a flowchart illustrating a message transfer process according to the fifth embodiment.

FIG. 23 is a flowchart illustrating the message transfer process executed in step S2045 under control of the CPU 11 of the MFP 1. The message transfer process is executed in response to receipt of a message transfer request from a DLNA device.

First, the MFP 1 transmits a recorded message designated by the received message transfer request. After receiving the recorded message form the MFP 1, the DLNA device is able to reproduce the received recorded message. Next, the MFP 1 changes the flag of the recorded message for which the transmission is conducted in step S2310, to "Listened" so that the file name of the recorded message is not contained in the list which is to be transmitted to the DLNA device in step S2035 later.

Since recorded massages which have been listened to by the user on the DLNA device are not listed in the list provided for the DLNA device, the recorded message which has been listened to by the user is prevented from being selected and reproduced on the DLNA device again.

As described above, the MFP 1 stores an incoming message from the IP telephone 8 or the analog telephone 9 as sound data (S2145). Therefore, the MFP 1 is able to transmit the sound data to the television 3 or the audio device 4 in response to a request from the television 3 or the audio device 4.

If once sound data (i.e., recorded message) is transmitted to the DLNA device, the sound data is treated as sound data already listened to by the user and the list is made such that only recorded messages which have not been listened to are listed in the list (S2210).

Such a configuration enables the DLNA device to provide only recorded messages which have not been listened to by the user, for the user.

As described above, when a DLNA device (e.g., the television 3 or the audio device 4) is connected to the LAN 5, the MFP 1 provides information (i.e., the list) concerning sound data stored in the MFP 1 for the DLNA device. Such a configuration enables the DLANA device to immediately obtain information concerning existence of incoming messages without requesting the DLNA device to transmit a request.

It is understood that the features of the MFP 1 according to the fifth embodiment can be applied to at least the MFP 1 according to the first to third embodiments.

Sixth Embodiment

Hereafter, an MFP according to a sixth embodiment is described. Since the MFP according to the sixth embodiment has the same hardware components as those of the MFP 1 according to the fifth (i.e., first) embodiment and the configuration of the network system 100 according to the fifth (i.e., first) embodiment can also be applied to the sixth embodiment, explanations of the sixth embodiment is made with reference to FIG. 1. In the following, only features of the sixth embodiment are explained.

Figure 24:
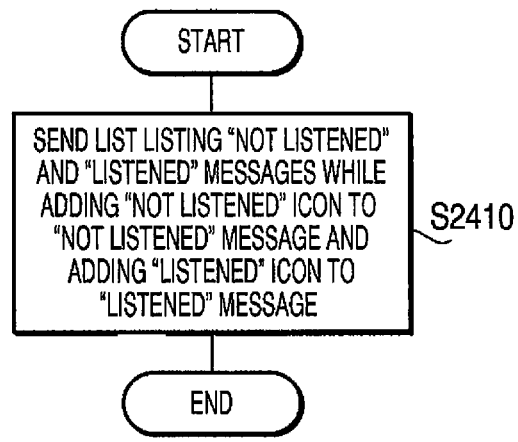
FIG. 24 is a flowchart illustrating a file list transfer process according to a sixth embodiment.

FIG. 24 is a flowchart illustrating a file list transfer process according to the sixth embodiment. The file list transfer process shown in FIG. 24 may be executed, under control of the CPU 11 of the MFP 1, in place of step S2035 in the main process according to the fifth embodiment.

When the file list transfer process is executed, the MFP 1 searches the answerphone data folder to generate a list listing all the message files including files which have been listened to and files which have not been listened to. Further, in this case, the MFP 1 generates the list such that a first type icon is added to each recorded message which has not been listened to, and a second type icon is added to each recorded message which has been listened to. That is, the first type icon indicates that each file to which the first type icon is added has not been listened to, while the second type icon indicates that each file to which the second type icon is added has been listened to. Hereafter, the first type icon is referred to as "not listened icon" and the second type icon is referred to as "listened icon".

It should be noted that in the sixth embodiment both the two types of recorded messages including a recorded message which has not been listened to and a recorded message which has been listened to are added to the list in contrast to the fifth embodiment where only recorded messages which have not been listened to are contained in the list.

In the list, a "not listened icon" is added to each recorded message which has not been listened to, and a "listened icon" is added to each recorded message which has been listened to. Such a configuration enables the DLNA device to display information on whether each message has been listened to or not on a display of the DLNA device.

For example, the "not listened icon" is formed to be different from the "listened icon" in at least one of colors, shapes, and patterns. Therefore, the user is able to visually distinguish between each recorded message which has not been listened to and each recorded message which has been listened to.

Figure 25:
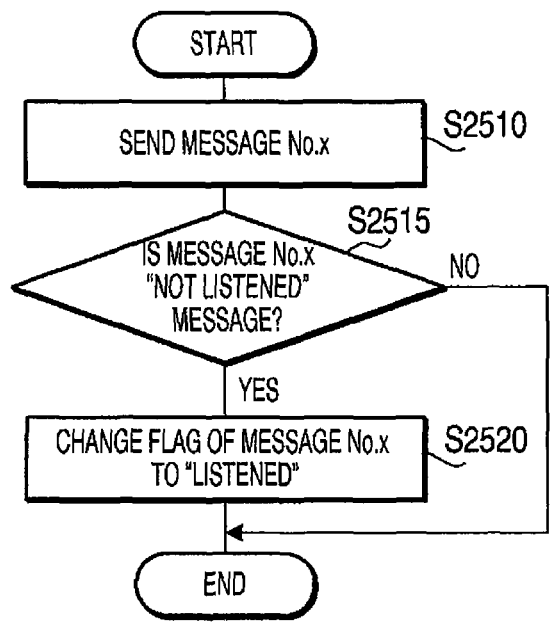
FIG. 25 is a flowchart illustrating a message transfer process according to the sixth embodiment.

FIG. 25 is a flowchart illustrating the message transfer process according to the sixth embodiment. The message transfer process shown in FIG. 25 is executed under control of the CPU 11 of the MFP 1 in place of step S2045 in the main process according to the fifth embodiment.

When the message transfer process is initiated, the MFP 1 transmits a designated recorded message ("No. x message file") to the DLNA device (step S2510). After receiving the recorded message in step S2510, the DLNA device is able to reproduce the recorded message. Then, the MFP 1 judges whether the "No. x message file" transmitted in step S2510 has been listened to (step S2515). If the "No. x message file" has been listened to (S2515: YES), the MFP 1 changes the status ("Listened"/"Not Listened") of the flag to "Listened" (step S2520). Then, the message transfer process terminates.

If the "No. x message file" has not been listened to (S2515: NO), the MFP 1 the message transfer process terminates without processing step S2520.

It is understood that in the sixth embodiment steps S2515 and S2520 are executed because a message file requested by the DLNA device is not limited to the message of the type which has not been listened to but there is a possibility that transmission of a message of the type which has not been listened to is requested by the DLNA device.

Since the list to be transmitted to the DLNA device includes both the message which has been listened to and the message which has not been listened to, the user is able to reproduce a message which has already been listened to. If the message requested by the user has already been listened to, execution of step S2520 can be omitted.

As described above, an incoming message transmitted from the DLNA device is stored in the MFP 1 as in the case of step S2145 of the fifth embodiment. In step S2045, the requested message can be transmitted to the DLNA device.

When the requested message is transmitted to the DLNA device, the transmitted message is recorded in the MFP 1 as a message which has been listened to. Information allowing the user to distinguish between the message which has been listened to and the message which has not been listened to is included in the list. Therefore, the DLNA device (e.g., the television 3 and the audio device 4) is able to display the list of the recorded messages such that the user is able to discriminate the message which has not been listened to and the message which has been listened to.

Seventh Embodiment

Hereafter, an MFP according to a seventh embodiment is described. Since the MFP according to the seventh embodiment has the same hardware components as those of the MFP 1 according to the fifth (i.e., first) embodiment and the configuration of the network system 100 according to the fifth (i.e., first) embodiment can also be applied to the seventh embodiment, explanations of the seventh embodiment is made with reference to FIG. 1. In the following, only features of the seventh embodiment are explained.

Figure 26:
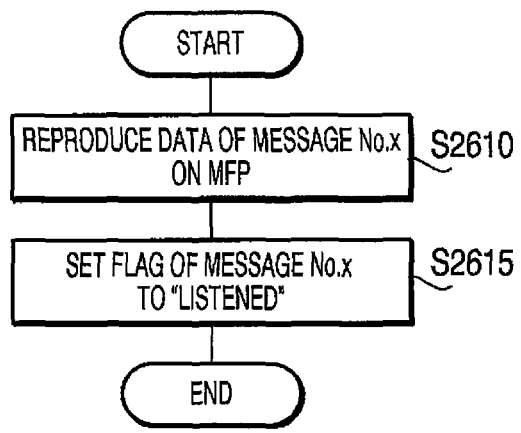
FIG. 26 is a flowchart illustrating a recorded message reproduction process executed by an MFP according to a seventh embodiment.

FIG. 26 is a flowchart illustrating a recorded message reproduction process executed under control of the CPU 11 of the MFP 1. The recorded message reproduction process is executed when a user operation for inputting a command requesting the MFP 1 to start reproduction of sound data is conducted by the user through the panel unit 14. In the user operation, the user selects a message file to be reproduced through the panel unit 14.

When the recorded message reproduction process is initiated, the MFP 1 reproduces the recorded message designated by the user (step S2610). After step S2610 is processed, the user is able to listened to sound corresponding to the recorded message through the internal speaker 21 or the speaker in the handset 20.

Then, the MFP 1 changes the status ("Listened"/"Not Listened") of the flag to "Listened" (step S2615). Then, the recorded message reproduction process terminates.

It is understood that the MFP 1 according to the seventh embodiment is able to achieve the same advantages as those of the fifth and sixth embodiments.

In the seventh embodiment, the recorded message reproduction process is additionally executed in the main process. Therefore, according to the seventh embodiment, it is possible to change the status of the flag of the message which is reproduced on the MFP 1 to "Listened" in addition to changing the status of the flag to "Listened".

Consequently, regarding representation of the message files on the television 3 or the audio device 4, it becomes possible to treat the message file which has been reproduced on the MFP 1 as in the case with the message file which has been reproduced on the television 3 or the audio device 4.

Eighth Embodiment

Hereafter, an MFP according to an eighth embodiment is described. Since the MFP 1 according to the eighth embodiment has the same hardware components as those of the MFP 1 according to the fifth (i.e., first) embodiment and the configuration of the network system 100 according to the fifth (i.e., first) embodiment can also be applied to the eighth embodiment, explanations of the eighth embodiment is made with reference to FIG. 1. In the following, only features of the eighth embodiment are explained.

In this embodiment, the flag representing the status "Listened"/"Not Listened" is added to a recorded message for each of DLNA devices.

FIG. 27 illustrates an example of the list listing the message files. As shown in FIG. 27, a plurality of flags are prepared for each of the recorded messages. The number of flags for each recorded message is equal to the number of DLNA devices on the network system 100. That is, regarding one message file, the flag is prepared for each of the DLNA devices. By providing such a list for the DLNA device, the DLNA device is able to refer to the flag representing whether the message file has been reproduced on the DLNA device.

Since each DLNA device has unique information to identify the DLNA device on a network, the MFP 1 is able to prepare a plurality of flags respectively corresponding to the DLNA devices on the network.

For example, a physical address (e.g., a MAC address) can be used as unique information for identifying each DLNA device. Regarding a network in which fixed logical addresses are assigned to devices, a logical address (e.g., an IP address) can be used as unique information. Regarding a network in which fixed device names are assigned to devices, a device name can be used as unique information. The MFP 1 may be configured to assign a unique number to each DLNA device in accordance with a request from each DLNA device.

It is understood that the MFP 1 according to the eighth embodiment is able to achieve the same advantages as those of the fifth and sixth embodiments.

Since the MFP 1 is able to control the status of the flag for each of the DLNA devices, when one (first user) of users reproduces a certain message file on the first user's DLNA device, the status of the flag is changed only for the first user's device. In other words, the fact that the first use reproduced a certain message file does not affect another user's flags. Therefore, it becomes possible to prevent each user from erroneously losing an opportunity to listen to an important message for the user.

It should be understood that, regarding the fifth to eight embodiments, the MFP 1 may operate to record an incoming message in the ADPCM format or in another sound data format (e.g., MP3 format). If the MFP 1 records the message file in the ADPCM format, the MFP 1 may transmit the recorded message without changing the data format of the recorded message, or the MFP 1 may transmit the recorded message after converting the data format of the recorded message from the DLNA format to another format (e.g., MP3).

If the MFP 1 transmit the recorded message to the DLNA device in the data format which is defined under the DLNA guideline, the DLNA device is able to reproduce the recorded message transmitted from the MFP 1. It should be understood that even if the MFP 1 transmits the recorded message to the DLNA device in the data format not supported by the DLNA device, the DLNA device is able decode the received message by providing the DLNA device with a dedicated decoder (e.g., a decoder unit or a software decoder). In any case, the advantages achieved by adding the flag to the list described in the above mentioned fifth to eight embodiments can also be obtained.

The list listing the message files and respective flags may be configured such that an expiration date is assigned to each flag. For example, the list may be configured as follows. For each message file of which time stamp is within a certain expiration period (e.g., a week, a month, or a year) antecedent to the present date, the flag is treated as valid information. On the other hand, the flag is treated as "Listened" if the time stamp of the message file is not with in a certain time period antecedent to the present time. Such a configuration makes it possible to prevent the "Not Listened" message file from staying in the MFP 1 for a long time. If such a configuration is employed in the eighth embodiment, the MFP 1 may be configured to set an expiration date for each of the DLNA devices or to set a common expiration date for all of the DLNA devices.

Ninth Embodiment

Hereafter, an MFP according to an ninth embodiment is described. Since the MFP 1 according to the ninth embodiment has the same hardware components as those of the MFP 1 according to the first embodiment and the configuration of the network system 100 according to the first embodiment can also be applied to the ninth embodiment, explanations of the ninth embodiment is made with reference to FIG. 1. In the following, only features of the ninth embodiment are explained.

Figure 28:
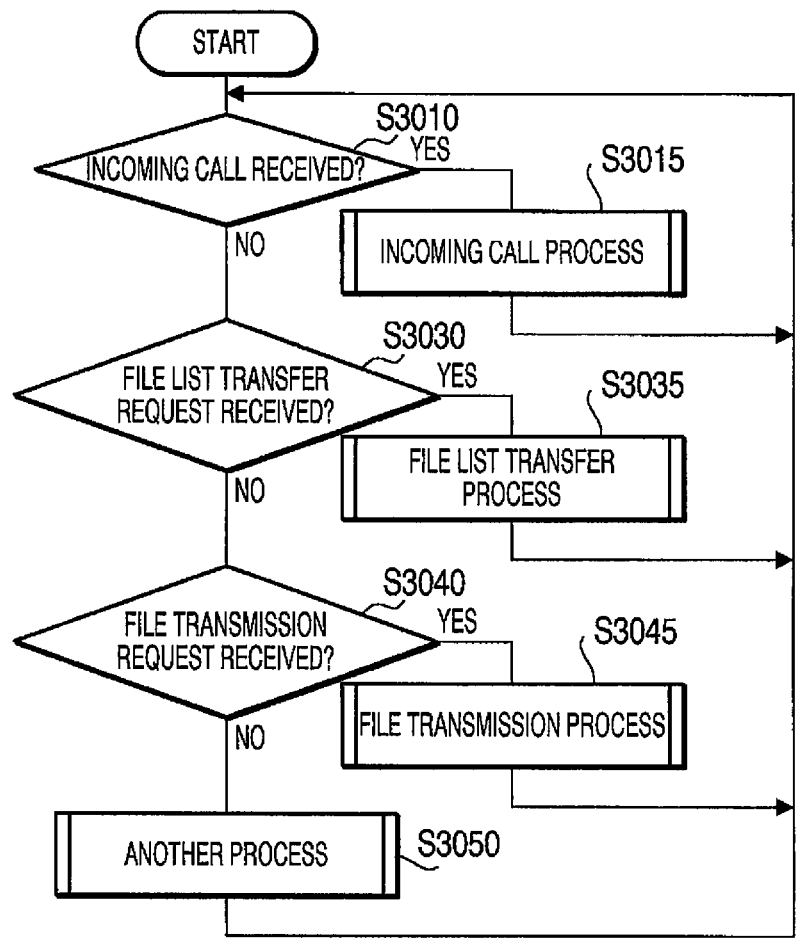
FIG. 28 is a flowchart illustrating a main process executed by an MFP according to a ninth embodiment.

FIG. 28 is a flowchart illustrating a main process executed under control of the CPU 11 of the MFP 1. The main process is initiated immediately after the MFP 1 turned to ON, and is executed repeatedly during the power on state of the MFP 1.

When the main process is initiated, the MFP 1 judges whether an incoming call is received (step S3010). The step S3010 is similar to step S10 of the main process according to the first embodiment. If an incoming call is received from an external telephone (S3010: YES), an incoming call process which is described in detail later is executed (step S3015). After the incoming call process is processed, control returns to step S3010.

If it is judged in step S3010 that no incoming call is received (S3010: NO), the MFP 1 judges whether a file list transfer request is received (step S3030). The step S3030 is similar to step S30 in the main process according to the first embodiment. If the MFP 1 judges that a file list transfer request is received (S3030: YES), the MFP 1 executes a file list transfer process which is described in detail later (step S3035). After the file list transfer process is executed, control returns to step S3010.

If the MFP 1 judges that the file list transfer request is not received (S3030: NO), the MFP 1 judges whether a file transmission request is received (step S3040). The step S3040 is similar to step S40 of the main process according to the first embodiment. If an file transmission request is received (S3040: YES), the MFP 1 executes a file transmission process which is described in detail later (step S3045). After the file transmission process is executed, control returns to step S3010.

If the MFP 1 judges that the file transmission request is not received (S3040: NO), the MFP 1 executes another process (step S3050). The step S3050 is similar to step S50 of the main process according to the first embodiment.

Figure 29:
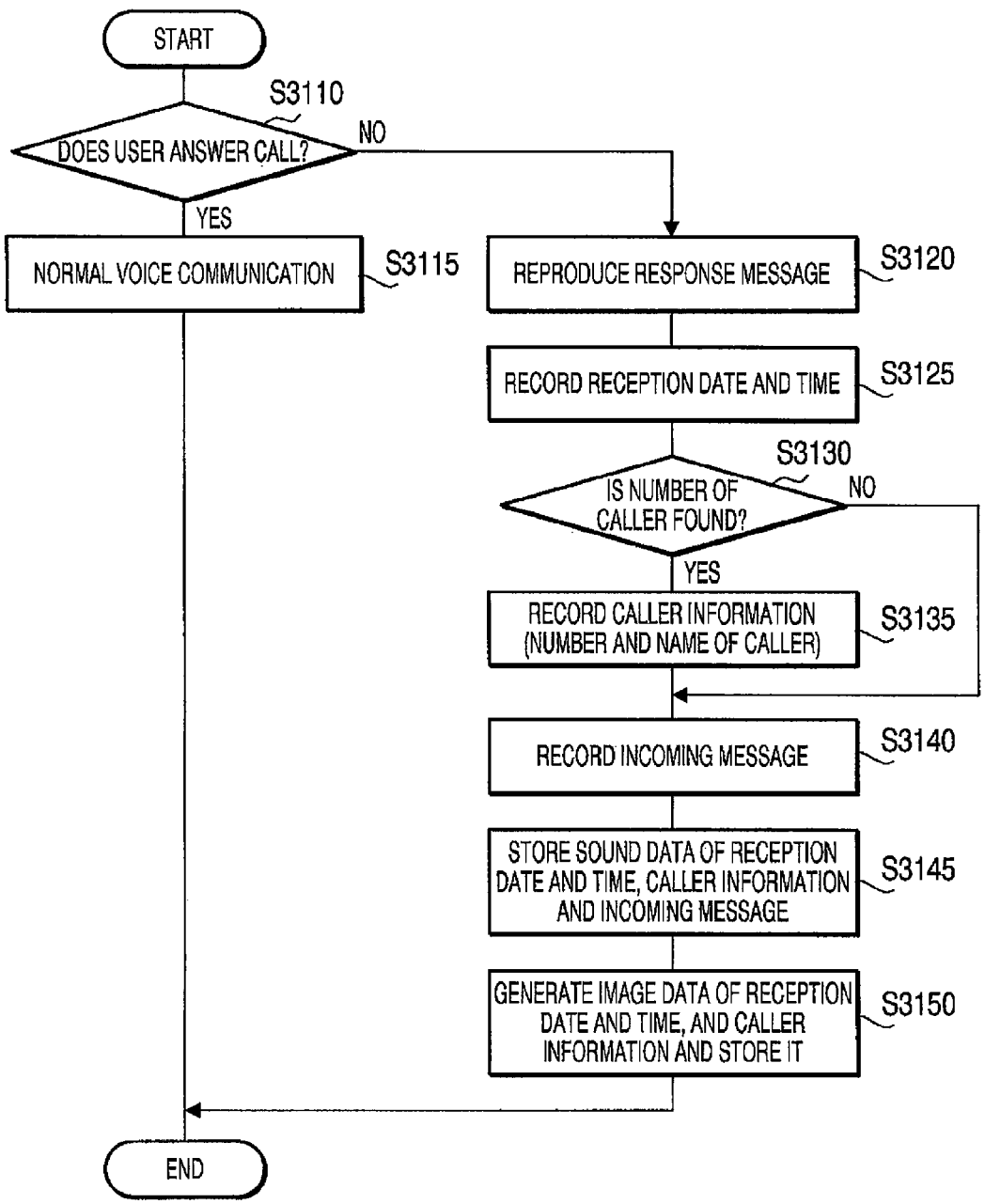
FIG. 29 is a flowchart illustrating an incoming call process according to the ninth embodiment.

FIG. 29 is a flowchart illustrating the incoming call process executed in step S3015 of the main process under control of the CPU 11 of the MFP 1. Since steps S3110 to S3140 are substantially the same as steps S110 to S140 in the incoming call process according to the first embodiment, explanations thereof will not be repeated.

If the MFP 1 judges that the user does not answer an incoming call (S3110: NO), steps S3120 to S3140 are processed. After an incoming message is recorded in step S3140, the reception date and time recorded in step S3125, the caller information recorded in step S3135, and the incoming message recorded in step S3140 are stored in the storage unit 22 as a message for one call (step S3145). If the external telephone is an analog telephone, the incoming message may be recorded in the ADPCM format. If the external telephone is an IP telephone, the incoming message may be recorded in μ-Law format or A-Law format without converting the format of the message from the IP telephone.

After step S3145 is processed, the MFP 1 generates image data of an image representing the reception date and time and the caller information, and stores the image data in the storage unit 22 (step S3150). Then, the incoming call process terminates. The image corresponding to the image data generated in step S3150 is, for example, a still image data to be displayed on the television 3. When the still image is displayed on the television 3, the user is able to recognize the reception date and time and the caller information (e.g., the phone number and the name of the caller.

The sound data and the image data generated in steps S3145 and S3150 are stored in a "recorded message folder" of the storage unit 22. FIG. 30 illustrates data folders in the storage unit 22. As shown in FIG. 30, an "Audio folder", an "Image folder" and a "Video folder" are made in the storage init 22. In the "Audio folder", a "MUSIC data folder" and the "recorded message folder" are made. In the "recorded message folder", each of the incoming message generated in step S3145 and the image data generated in step S3150 are stored in the form of a file name "a string "TEL"+a serial number-.extension".

Since the incoming message and the image data in the recorded message folder have the extension of "ADPCM" and "JPEG", respectively, it is understood that the recorded message is sound data decoded in ADPCM format and the image data is decoded in JPEG format. Since the sound data and the image data corresponding to the same incoming message have the same string ("TEL" and the serial number), it is understood which of pieces of data should be treated in a pair.

As shown in FIG. 30, MP3 sound files, JPEG still images and MPEG moving images are stored in the "MUSIC data folder", "Image folder" and "Video folder", respectively. These files are stored in advance in the MFP 1 so that the MFP 1 can provide these files for a player (i.e., the television 3 and the audio device 4) when the MFP 1 serves as a server.

Figure 31:
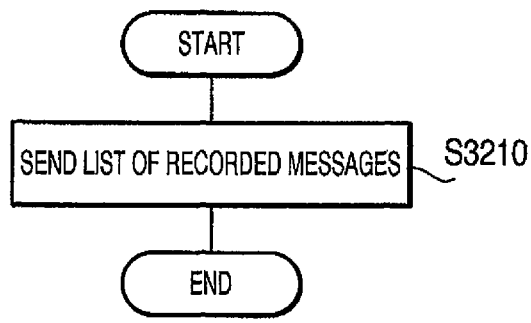
FIG. 31 is a flowchart illustrating a file list transfer process according to the ninth embodiment.

FIG. 31 is a flowchart illustrating the file list transfer process executed in step S3035 under control of the CPU 11 of the MFP 1. When the file list transfer process is initiated, the MFP 1 generates a file list listing files of the sound data and the mage data stored in the recorded message folder, and transmits the file list to the DLNA device.

Similarly to step S310 of the file list transfer process according to the first embodiment, in the file list a file name of the sound data may be changed to have the extension "MP3". In this case, if the MFP 1 is requested to transmit the sound data to the DLNA device, the MFP 1 converts the format of the sound data form the ADPCM to the MP3 and transmits the converted sound data to the DLNA device. After step S3210 is processed, the file list transfer process terminates.

Figure 32:
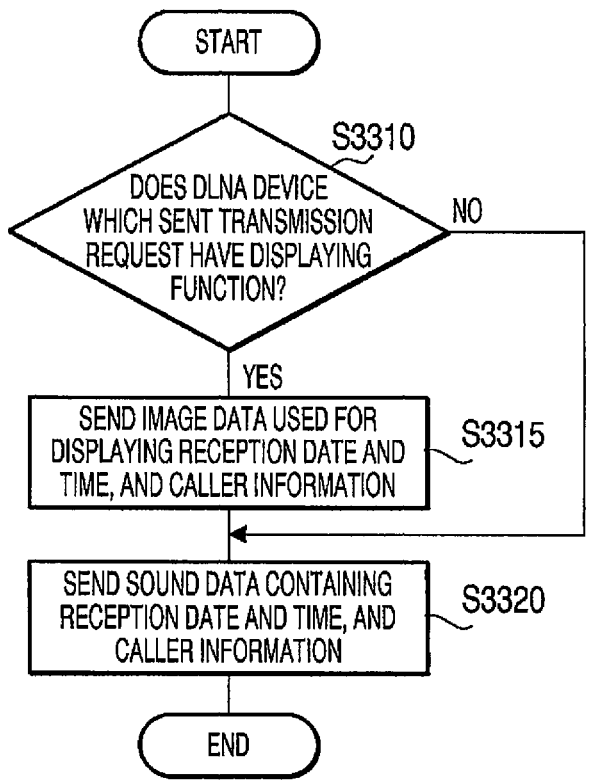
FIG. 32 is a flowchart illustrating a file transmission process according to the ninth embodiment.

FIG. 32 is a flowchart illustrating the file transmission process executed in step S3045 under control of the CPU 11 of the MFP 1. When the file transmission process is initiated, the MFP 1 judges whether the DLNA device which transmitted the file transmission request has a displaying function (step S3310). Whether the DLNA device has the displaying function can be detected from information obtained from the DLNA device. If the DLNA device which transmitted the file transmission request, the MFP 1 judges that the DLAN device has the displaying function. On the other hand, if the DLNA device is the audio device 4, the MFP 1 judges that the DLNA device does not have the displaying function.

If the MFP 1 judges that the DLNA device has the displaying function (S3310: YES), the MFP 1 transmits the image data for displaying the reception date and time and the caller information, to the DLNA device (step S3315). More specifically, the MFP 1 selects a file name ""TEL"+serial number. JPEG" based on the request. The part ""TEL"+serial number" corresponds to the file name requested by the DLNA device. If the MFP 1 judges that the DLNA device does not have the displaying function (S3310: NO), step S3315 is skipped and control proceeds to step S3320.

Next, the MFP 1 transmits the sound data including the reception date and time to the DLNA device (step S3320). In step S3320, the file having the file name ""TEL"+serial number.ADPCM". The part ""TEL"+serial number" corresponds to the file name requested by the DLNA device. It should be noted that MFP 1 may converts the file format of the sound data, for example, to MP3 format, and transmits the converted sound data having the file name ""TEL"+serial number.MP3" to the DLNA device.

After step S3320 is processed, the file transmission process terminates. It should be understood that the order in which the transmission of the image data and transmission of sound data are performed may be changed. The DLNA device which received the sound data and the image data is able to process (i.e., displaying and reproducing) the received data regardless of the order in which transmission of the image data and transmission of sound data are performed.

For example, the DLNA device is able to simultaneously display the image corresponding to the image data and reproduce the sound data regardless of the order in which transmission of the image data and transmission of sound data are performed. It is also possible to control, from the MFP 1, the timing for displaying the image corresponding to the image data and reproducing the sound data. For example, if the MFP 1 transmits a control message expressed by XML in addition to transmitting the image data and the sound data to the DLNA device, it becomes possible to control the DLNA device such that representation of the image and reproduction of the sound data are performed in timing designated by the MFP 1.

By receiving the image data for displaying the reception date and time and the caller information in the file transmission process is performed, the television 3 becomes able to display the image corresponding to the received image data. For example, the image data includes text, fine names and icons for enabling the user to recognize who the caller is and what number the caller has.

For example, on the television 3, words "You have a telephone message. Aug. 8, 2006 05212341234" including information on the reception date and the number of the caller are displayed. Alternatively, words "You have a telephone message. Aug. 8, 2006 Mr. ITO" including information on the reception date and the name of the caller obtained form address data based on the number of the caller are displayed.

As described above, the sound data of the incoming message and the sound data for reading aloud the reception date and time are stored by steps S3125, S3140 and S3145. In step S3320, the sound data is transmitted to the television 3 or the audio device 4 in response to the request from the television 3 or the audio device 4.

Therefore, the television 3 or the audio device 4 is able to reproduce the sound data for indicating the reception date and time. Consequently, it is possible to indicate the reception date and time of the incoming message by sound. Such a configuration enables the user to recognize the reception date and time of the incoming message without requesting the user to perform a troublesome user operation for checking the recorded time and history of incoming calls. Therefore, usability can be enhanced.

As described above, the MFP 1 generates the image data for indicating the reception date and time of the incoming message in step S150 and judges whether the DLNA device is able to display the image corresponding to the image data. The MFP 1 transmits the image data for indicating the reception date and time in response to judging that the DLNA device has the displaying function (i.e., the DLNA device is the television 3).

Consequently, the television 3 becomes able to display the mage corresponding to the image data for indicating the reception date and time. The MFP 1 is able to indicate the reception date and time through the image. Therefore, the user is also able to visually recognize the reception date and time.

As described above, the MFP 1 converts the caller information concerning the caller of the incoming message into sound data reading aloud the caller information (S3130, S3135), and transmits the converted sound data (S3320).

Therefore, the television 3 or the audio device 4 is able to reproduce the sound data for indicating the caller information. Such a configuration enables the user to recognize the caller information through sound.

It is understood that the features of the MFP 1 according to the ninth embodiment can be applied to at least the MFP 1 according to the first to third and fifth to eighth embodiments.

Tenth Embodiment

Hereafter, an MFP according to a tenth embodiment is described. Since the MFP 1 according to the tenth embodiment has the same hardware components as those of the MFP 1 according to the ninth (i.e., first) embodiment and the configuration of the network system 100 according to the ninth (i.e., first) embodiment can also be applied to the tenth embodiment, explanations of the tenth embodiment is made with reference to FIG. 1. In the following, only features of the tenth embodiment are explained.

As described in detail below, the MFP 1 according to the tenth embodiment is configured to transmit different types of sound data files to the DLNA device having the displaying function and the DLNA device not having the displaying function, respectively. This feature in different from the first embodiment where the same sound data file is transmitted to the television 3 and the audio device 4 in the first embodiment. The main process according to the tenth embodiment is executed as follows.

In the MFP 1 according to the tenth embodiment, the same folders as those of the ninth embodiment are made in the storage unit 22 as shown in FIG. 33. However, in contrast to the ninth embodiment, two types of sound files are stored for each incoming message. The two types of sound files include a first type sound file having a file name ""TEL"+serial number.ADPCM" and a second type sound file having a file name ""TEL"+serial number+DATE+TIME+NUMBER.ADPCM". The DATE in the file name is a number representing a reception date of an incoming message, TIME is a number representing a reception time of an incoming message, and NUMBER represents a phone number of a caller.

In addition to storing the two types of sound files, image data (e.g., a JPEG file) which is the same as the image data generated in the ninth embodiment is generated in the tenth embodiment. Therefore, in this embodiment, three files are prepared for one recorded message. From the part ""TEL"+serial number" of the file name, it is understood that which of sound and image files should be treated in a pair.

The first type sound file is used for the DLNA device having the displaying function (e.g., the television 3). In the first type sound file, only the incoming message recorded in step S3140 is stored.

The second type sound file is used for the DLNA device not having the displaying function (e.g., the audio device 4). In the second type sound file, the reception date and time recorded in step 83125, the call information recorded in step S3135, and the incoming message recorded in step S3140 are stored.

When the sound data is stored in the storage unit 22 in step S3145, only the incoming message is stored in the first type sound file, and all of the reception date and time, the caller information and the incoming message are stored in the second type sound file. The two types if sound files are thus stored in the storage unit 22.

Figure 34:
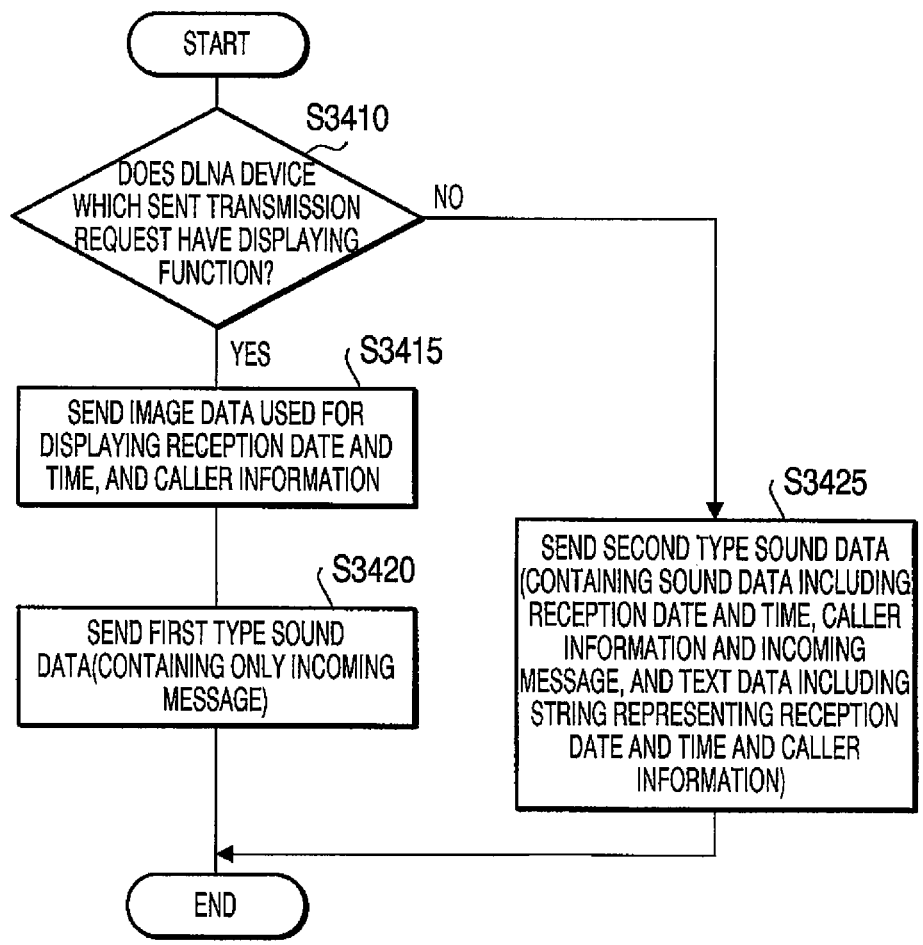
FIG. 34 is a flowchart illustrating a file transmission process according to the tenth embodiment.

FIG. 34 is a flowchart illustrating a file transmission process executed under control of the CPU 11 of the MFP 1 in step S3045 of the main process shown in FIG. 28X When the file transmission process is initiated, the MFP 1 judges whether the DLNA device which transmitted a file transmission request has the displaying function (step S3410). The step S3410 is similar to step S3310 of the ninth embodiment.

If the MFP 1 judges that the DLNA device has the displaying function (S3410: YES), the MFP 1 transmits the image date for displaying the reception date and time and the caller information (step S3415). The step S3415 is similar to step S3315 of the ninth embodiment.

Next, the MFP 1 transmits the first type sound file (step S3410). As described above, the first type sound file transmitted in step S3420 is a sound file like one having a file name ""TEL"+serial number.ADPCM" stored in the recorded message folder. In the first type sound file, only the incoming message is stored. The part ""TEL"+serial number" in the file name corresponds to a string designated by the DLNA device.

If the MFP 1 judges that the DLNA device does not have the displaying function (S3410: NO), the MFP 1 transmits the second type sound file (step S3425). As described above, the second type sound file transmitted in step S3425 is a sound file like one having a file name ""TEL"+serial number+DATE+TIME+NUMBER.ADPCM" stored in the recorded message folder. The second type sound file may be assigned a file name ""TEL"+serial number+DATE+TIME+NAME.ADPCM". In this case, NAME represents a user's name obtained by searching the address data using the phone number of the user as a keyword. In the second type sound file, all of the reception date and time, the caller information and the incoming message are stored. The part ""TEL"+serial number" in the file name corresponds to a string designated by the DLNA device.

When the first type sound file or the second type sound file is transmitted in step S3420 or S3425, the MFP 1 may transmit the file name of the file as text information together with the sound data in the file, to the television 3 or the audio device 4. Since the file name of the second type sound file includes the reception date and time and the caller information (i.e., the number of caller), text data including the reception date and time and the caller information can also be transmitted to the audio device 4 by transmitting the file name of the second type sound file.

It is understood that the sound data transmitted in step S3415 or S3425 may be formed as sound data having the MP3 format. In this case, the sound data having the MP3 format is transmitted to the television 3 or the audio device as the first type sound file or the second type sound file.

After steps S3420 or S3425 is thus processed, the file transmission process terminates.

After the file transmission process is executed, the television 3 becomes able to display an image corresponding to the received image data as in the case of the ninth embodiment.

After receiving the second type sound file in the file transmission process, the audio device 4 becomes able to reproduce the reception date and time and the caller information through sound, and is able to display file name of the received file on a display capable of display text information. Consequently, the audio device 4 allows the user to visually recognize the reception date and time and the caller information.

For example, a file name "TEL-20060808-05212341234.ADPCM" is displayed on the audio device 4. This file name indicates that the reception date and time is Aug. 8, 2006 and the number of the caller is 05212341234. Alternatively, a file name "TEL-20060808-ITPU.ADPCM" is displayed on the audio device 4. The name ITOU can be obtained by searching the address data using the number of the caller as a keyword.

As described above, if a destination is the television 3, the MFP 1 transmits the image data for displaying the reception date and time and the caller information in step S3415, and transmits the sound data including only the incoming message in step S3420. Therefore, the television 3 is able to reproduce the incoming message and display an image corresponding to the image data. In contrast to the ninth embodiment, the reception date and time and the caller information are not reproduced on the television 3. Such a configuration enables the television 3 to quickly execute the reproduction of the sound data.

If a destination is the audio device 4, the MFP 1 transmits the sound data including all of the reception date and time, the caller information and the incoming message, to the audio device 4. Such a configuration enables the user of the audio device 4 to recognize the reception date and time and the caller information through sound. In contrast o the ninth embodiment, the reception date and time and the caller information is transmitted to the audio device 4 as a string forming apart of the file name of the sound data. Such a configuration enables the audio device to indicate the reception date and time and the caller information by only displaying the file name provided by the MFP 1.

Eleventh Embodiment

Hereafter, an MFP according to an eleventh embodiment is described. Since the MFP 1 according to the eleventh embodiment has the same hardware components as those of the MFP 1 according to the ninth (i.e., first) embodiment and the configuration of the network system 100 according to the ninth (i.e., first) embodiment can also be applied to the eleventh embodiment, explanations of the eleventh embodiment is made with reference to FIG. 1. In the following, only features of the eleventh embodiment are explained.

Figure 35:
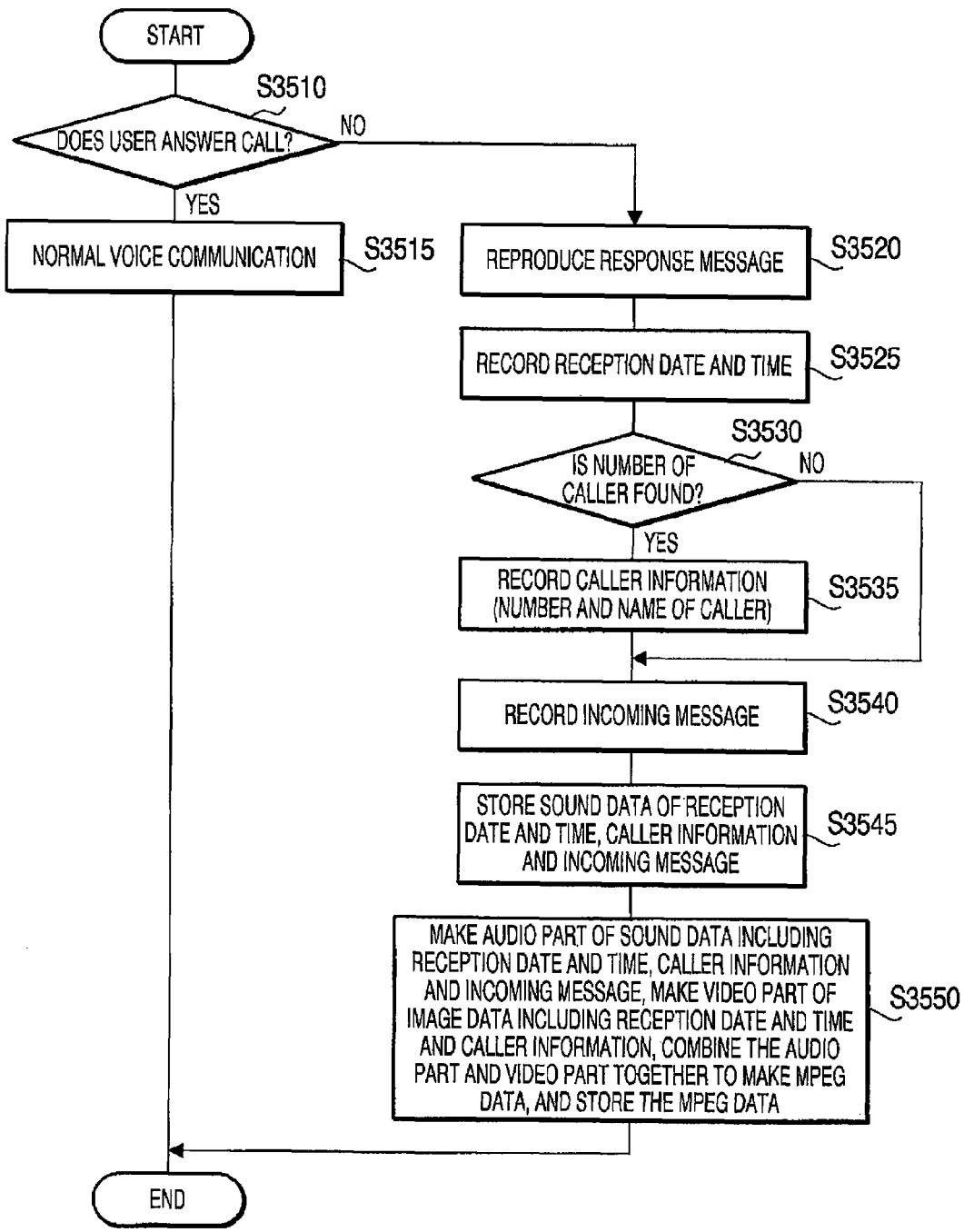
FIG. 35 is a flowchart illustrating an incoming call process executed by an MFP according to an eleventh embodiment.

FIG. 35 is a flowchart illustrating an incoming call process executed in step S3015 shown in FIG. 28 under control of the CPU 11 of the MFP 1. The incoming call process shown in FIG. 35 is executed in place of the incoming call process shown in FIG. 29. Since steps S3510 to S3540 are substantially the same as steps S3110 to S3140 in FIG. 29, explanations thereof are made concisely.

When the incoming call process is initiated, the MFP 1 judges whether the user answers an incoming call (step S3510). If the user answers the incoming call (S3510: YES), the MFP 1 executes a process for normal voice communication (step S3515). Then, the incoming call process terminates.

If the user does not answer the incoming call (S3510: NO), the MFP 1 reproduces a response message (step S3520). Then, the MFP 1 records a reception date and time of the incoming call (step S3525). Next, the MFP 1 judges whether the number of a caller is obtained (step S3530). If the number of the caller is obtained (S3530: YES), the MFP 1 records caller information (step S3535). If the number of the caller is not obtained (S3530: NO), the MFP 1 control proceeds to step S3540 without processing step S3535.

In step S3540, the incoming message from an external telephone is recorded. Then, the reception date and time recorded in step S3525, the caller recorded in step S3535 and the incoming message recorded in step S3540 are stored in the storage unit 22 as one message (step S3545).

Next, in step S3550, the MFP 1 generates MPEG data by writing audio data formed of the reception date and time recorded in step S3525, the caller recorded in step S3535 and the incoming message recorded in step S3540 is included in an audio part, writing image data representing the reception date and time and the caller information is included in a video part, and then combining the audio part and the video part together so that the audio data and the video data are multiplexed. Then, the MFP 1 stores the MPEG data in the storage unit 22.

It is understood that the audio data in the audio part of the MPEG data is substantially the same as the audio data of one message stored in step S3145 in the ninth embodiment, and the video data in the video part of the MPEG data is substantially the same the image data stored in step S3150 in the ninth embodiment. That is, by reproducing the MPEG data, a still image is reproduced for a certain time period as a moving image.

FIG. 36 illustrates an example of a folder structure stored in the storage unit 22. As shown in FIG. 36, an "Audio folder", an "Image folder" and a "Video folder" are made in the storage init 22. In the "Video folder", a "recorded message video folder" and a "TV telephone folder" are made. In step S3550, the MPEG data is formed to have a filename ""TEL"+a serial number "MPEG"". This MPEG file is stored in the "recorded message video folder".

It is understood that if the MFP 1 has a television telephone function and an incoming message is received from an external television telephone (i.e., an incoming message corresponds to image data and audio data), the MFP 1 may operates to record the incoming message (television telephone data), and to generate video data in which the recorded television telephone data and image data for displaying the reception date and time and the caller information are combined together, and to store the combined video data in the "TV telephone folder" of the storage unit 22.

Figure 37:
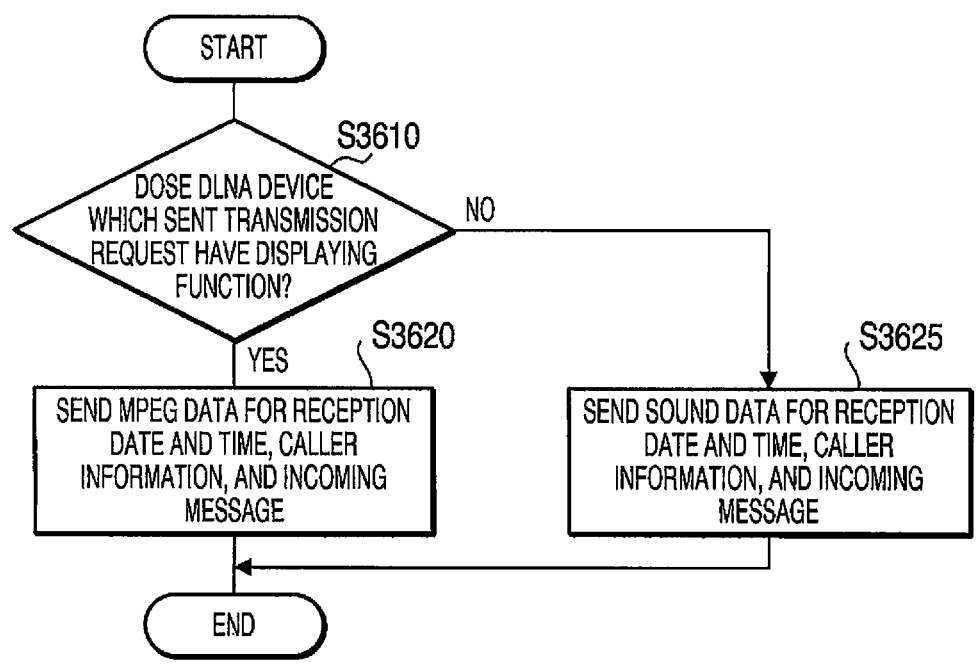
FIG. 37 is a flowchart illustrating a file transmission process according to the eleventh embodiment.

FIG. 37 is a flowchart illustrating a file transmission process executed under control of the CPU 11 of the MFP 1. The file transmission process shown in FIG. 37 is executed in step S2045 of the main process shown in FIG. 28. That is, the file transmission process shown in FIG. 37 is executed in place of the file transmission process shown in FIG. 32.

When the file transmission process is initiated, the MFP 1 judges whether the DLNA device which transmitted a file transmission request has the displaying function (step S3610). The step S3610 is substantially the same as steps S3310 in the ninth embodiment or the step S3410 in the tenth embodiment.

If the MFP 1 judges that the DLNA device has the displaying function (S3610: YES), the MFP 1 transmits MPEG data representing the reception date and time (generated in step S3550), the caller information and the incoming message, to the DLNA device (e.g., the television 3) (step S3620).

If the MFP 1 judges that the DLNA device odes not have the displaying function (S3610: NO), the MFP 1 transmits the sound data including the reception date and time, the caller information and the incoming message (generated in step S3545), to the DLNA device (step S3625). After step S3620 or S3625 is processed, the file transmission process terminates.

The television 3 which received the MPEG data in the file transmission process becomes able to reproduce a moving image (i.e., video and sound) corresponding to the received MPEG data. The audio device 4 which received the sound file in the file transmission process becomes able to reproduce the reception date and time and the caller information as sound.

As described above, if a destination is the television 3, the MPEG data can be transmitted to the destination. Therefore, the television 3 is able to output voice corresponding to the incoming message while displaying the image of the reception date and time and the caller information.

It should be understood that, regarding the ninth to eleventh embodiments, the MFP 1 may operate to record an incoming message in the ADPCM format or in another sound data format (e.g., MP3 format). If the MFP 1 records the message file in the ADPCM format, the MFP 1 may transmit the recorded message without changing the data format of the recorded message, or the MFP 1 may transmit the recorded message after converting the data format of the recorded message from the DLNA format to another format (e.g., MP3).

If the MFP 1 transmit the recorded message to the DLNA device in the data format which is defined under the DLNA guideline, the DLNA device is able to reproduce the recorded message transmitted from the MFP 1. It should be understood that even if the MFP 1 transmits the recorded message to the DLNA device in the data format not supported by the DLNA device, the DLNA device is able decode the received message by providing the DLNA device with a dedicated decoder (e.g., a decoder unit or a software decoder). In any case, the advantages achieved in the above mentioned ninth to eleventh embodiments can also be obtained.

In the above mentioned ninth to eleventh embodiments, the still image data or the video data is configured to display a name and the phone number of the caller as caller information. However, if address data of the MFP 1 includes various types of information in association with each phone number, the MFP 1 may operate to form the still image data or the video data for displaying the various types of information associated with the phone number of the caller. For example, if an illustration, a photograph and a background image color is stored in association with each phone number, the MFP 1 may operate to generate the still image data or the video data representing an image including an illustration or a photograph associated with the number of the caller, or to generate the still image data or the video data representing an image having a background image stored in association with the number of the caller.

In the above mentioned tenth embodiment, both of the first type sound data including only the incoming message and the second type sound data including all of the reception date and time, the caller information and the incoming message are stored in the storage unit 22. It is understood that such a function can also be achieved in various ways. For example, the MFP 1 may operate to store three files including a file A containing only the reception date and time, a file B containing only the caller information and a file C containing only the incoming message, in the storage unit 22. In this case, the MFP 1 may operate to transmit only the file C to the DLNA device having the displaying function, and to transmit all of the files A, B and C to the DLNA device not having the displaying function.

although the MFP 1 employed in the communication system 100 has the scanner function, the printing function, the copying function and the facsimile function. The configuration of the MFP 1 is not limited to those of the above mentioned embodiments.

In the above mentioned embodiments, the MFP 1 has both of the server function and the player function defined under the DLNA guideline. However, the MFP 1 may be configured not to have the player function.

In the incoming call process according to the above mentioned embodiments, the reproduction of a response message, recordation of reception date and time, recordation of caller information, recordation of an incoming message are executed in this order. However, the processing order can be changed. For example, the recordation of a reception date and time or the recordation of caller information may be executed concurrently with the reproduction of a response message. Alternatively, the recordation of a reception date and time or the recordation of caller information may be executed after the recordation of an incoming message.

The MFP 1 may operate to combine the reception date and time, the caller information and the incoming message into one file while executing the recordation of a reception date and time, the recordation of caller information and recordation of an incoming message. Alternatively, the MFP 1 may execute the recordation of a reception date and time, the recordation of caller information and recordation of an incoming message in a certain order, while generating temporally files corresponding to these pieces of recorded data and then combining these files into one file.

In the above mentioned embodiment, the explanations are made using a MP3 format as an example of the DLNA format. However, the MFP 1 may be configured to support another file format complying with the DLNA guideline.

It is understood that the MFP 1 may have a plurality of operation modes corresponding to the above mentioned embodiments.

What is claimed is:

1. A communication device, comprising:
 a first communication unit configured to communicate with a first device having a telephone function, through a first network;
 a second communication unit configured to communicate with a second device having a function of reproducing sound through a second network;
 a receiving unit configured to receive an incoming message from the first device;
 a data storage unit configured to store an incoming message from the first device as sound data having a first data format which the second device does not support;
 a conversion unit configured to convert the sound data having the first data format to sound data having a second data format which the second device supports;
 a time obtaining unit configured to obtain time information representing a reception time when the incoming message from the first device is received;
 a reception time data generating unit configured to generate reception time data representing the reception time based on the reception time; and
 a sound data transmission unit configured to transmit the sound data having the second data format converted by the conversion unit and the generated reception time data to the second device through the second network.

2. The communication device according to claim 1, wherein the conversion unit converts the sound data having the first data format to sound data having the second data format in response to reception of a file transmission request.

3. The communication device according to claim 2, further comprising:
 an information generation unit configured to generate list information representing a list of pieces of sound data stored in the communication device; and
 an information transmission unit configured to transmit the list information to the second device,
 wherein the information generation unit generates the list information such that in the list a first type of information concerning the sound data having the first data format is converted to a second type of information representing the sound data having the second data format.

4. The communication device according to claim 3, wherein:
 the first type of information concerning the sound data having the first data format is an extension of a file name of the sound data having the first data format; and
 the second type of information representing the sound data having the second data format is an extension of a file name of the sound data having the second data format.

5. The communication device according to claim 1, further comprising:
 a detection unit configured to detect whether the second device is connected to the second network,
 wherein the conversion unit converts the sound data having the first data format to the sound data having the second data format in response to detection of connection of the second device to the second network by the detection unit.

6. The communication device according to claim 5, wherein:
 the data storage unit further stores the incoming message as sound data having the second data format; and
 the sound data transmission unit transmits the sound data having the second data format stored in the data storage unit, to the second device,
 wherein the communication device further comprises:
  a judgment unit configured to judge whether the second device detected by the detection unit is disconnected from the second network; and
  a deletion unit configured to delete the sound data having the second data format stored in the data storage unit in response to judgment that the second device is disconnected from the second network by the judgment unit.

7. The communication device according to claim 1, further comprising a combining unit configured to combine a plurality of pieces of sound data having the second data format into a piece of combined sound data,
 wherein the sound data transmission unit transmits the combined sound data to the second device.

8. The communication device according to claim 1, further comprising:

a reproduction recordation unit configured to register the sound data which has been transmitted to the second device by the sound data transmission unit, as reproduced sound data;

a reproduction judgment unit configured to judge whether the sound data stored in the data storage unit is registered as reproduced sound data by the reproduction recordation unit; and a sound data information transmission unit configured to generate sound data information concerning the sound data judged not to be registered as reproduced sound data by the reproduction judgment unit, and to transmit the sound data information to the second device.

9. The communication device according to claim 8, further comprising a detection unit configured to detect whether the sound device is connected to the second network, wherein the sound data information transmission unit transmits the sound data information to the second device in response to detection of connection of the second device to the second network by the detection unit.

10. The communication device according to claim 8, further comprising a reproduction unit configured to reproduce the sound data stored in the data storage unit, wherein the reproduction recordation unit registers additionally the sound data which is reproduced by the reproduction unit, as reproduced sound data.

11. The communication device according to claim 1, further comprising:

a reproduction recordation unit configured to register the sound data which has been transmitted to the second device by the sound data transmission unit, as reproduced sound data;

a reproduction judgment unit configured to judge whether the sound data stored in the data storage unit is registered as reproduced sound data by the reproduction recordation unit; and a sound data information transmission unit configured to generate sound data information concerning the sound data stored in the data storage unit, and to transmit the sound data information to the second device, wherein the sound data information transmission unit generates the sound data information such that the sound data information includes information enabling the second device to provide the sound data judged not to be registered as reproduced sound data by the reproduction judgment unit and the sound data judged to be registered as reproduced sound data by the reproduction judgment unit in different forms.

12. The communication device according to claim 1, further comprising a sound conversion unit configured to convert the time information to time indication sound data used to indicate the time information by voice, wherein:

the data storage unit stores additionally the time indication sound data converted by the sound conversion unit; and the sound data transmission unit transmits additionally the time indication sound data to the second device.

13. The communication device according to claim 12, further comprising:

an image conversion unit configured to convert the time information to time indication image data used to indicate the time information through an image; and a judgment unit configured to judge whether the second device has a displaying unit capable of displaying an image corresponding to the time indication image data, wherein the sound data transmission unit transmits additionally the time indication image data to the second device in response to judgment that the second device has the display unit by the judgment unit.

14. The communication device according to claim 13, wherein the sound data transmission unit transmits additionally text information including a character string corresponding to the time information, to the second device in response to judgment that the second device does not have the display unit by the judgment unit.

15. The communication device according to claim 12, wherein:

the sound conversion unit converts additionally caller information concerning a caller of the incoming message to caller indication sound data used to indicate the caller information by voice; and the sound data transmission unit transmits additionally the caller information sound data to the second device.

16. The communication device according to claim 1, further comprising an image conversion unit configured to convert the time information to time indication image data used to indicate the time information through an image, wherein:

the data storage unit stores additionally the time indication image data converted by the image conversion unit; and the sound data transmission unit transmits additionally the time indication image data to the second device.

17. A communication device, comprising:

a first communication unit configured to communicate with a first device having a telephone function through a first network;

a second communication unit configured to communicate with a second device having a function of reproducing sound, through a second network;

a receiving unit configured to receive an incoming message from the first device;

a data storage unit configured to store the incoming message received from the first device as sound data;

a time obtaining unit configured to obtain time information representing a reception time when the incoming message from the first device is received;

a reception time data generating unit configured to generate reception time data representing the reception time based on the reception time a sound data transmission unit configured to transmit the sound data and the generated reception time data to the second device in response to a request from the second device;

a reproduction recordation unit configured to register the sound data which has been transmitted to the second device by the sound data transmission unit, as reproduced sound data;

a reproduction judgment unit configured to judge whether the sound data stored in the data storage unit is registered as reproduced sound data by the reproduction recordation unit; and a sound data information transmission unit configured to generate sound data information concerning the sound data when the reproduction judgment unit judges that the sound data is not registered as reproduced sound data, and to transmit the sound data information and the generated reception time data to the second device.

18. A communication device, comprising:

a first communication unit configured to communicate with a first device having a telephone function through a first network;

a second communication unit configured to communicate with a second device having a function of reproducing sound, through a second network;

a receiving unit configured to receive an incoming message from the first device;

a data storage unit configured to store the incoming message received from the first device as sound data;

a time obtaining unit configured to obtain time information representing a reception time when the incoming message from the first device is received;

a reception time data generating unit configured to generate reception time data representing the reception time based on the reception time;

a sound data transmission unit configured to transmit the sound data and the generated reception time data to the second device in response to a request from the second device;

a reproduction recordation unit configured to register the sound data which has been transmitted to the second device by the sound data transmission unit, as reproduced sound data;

a reproduction judgment unit configured to judge whether the sound data stored in the data storage unit is registered as reproduced sound data by the reproduction recordation unit; and a sound data information transmission unit configured to generate sound data information concerning the sound data stored in the data storage unit, and to transmit the sound data information and the generated reception time data to the second device, wherein the sound data information transmission unit generates the sound data information such that the sound data information includes information enabling the second device to provide the sound data judged in a first form when the reproduction judgment unit judges that the sound data is not registered as reproduced sound data and in a second form when the reproduction judgment unit judges that the sound data is registered as reproduced sound data.

19. A communication device, comprising:

a first communication unit configured to communicate with a first device having a telephone function through a first network;

a second communication unit configured to communicate with a second device having a function of reproducing sound, through a second network;

a receiving unit configured to receive an incoming message from the first device;

a time obtaining unit configured to obtain time information representing a time when the incoming message from the first device is received;

a sound conversion unit configured to convert the time information to time indication sound data used to indicate the time information by voice;

a data storage unit configured to store sound data corresponding to the incoming message and the time indication sound data converted by the sound conversion unit; and a sound data transmission unit configured to transmit the time indication sound data and the sound data corresponding to the incoming message stored in the data storage unit, to the second device.

20. A communication device, comprising:

a first communication unit configured to communicate with a first device having a telephone function through a first network;

a second communication unit configured to communicate with a second device having a fraction of reproducing sound, through a second network;

a receiving unit configured to receive an incoming message from the first device;

a time obtaining unit configured to obtain time information representing a time when the incoming message from the first device is received;

an image conversion unit configured to convert the time information to time indication image data used to indicate the time information through an image;

a data storage unit configured to store sound data corresponding to the incoming message and the time indication image data converted by the image conversion unit; and a sound data transmission unit configured to transmit the time indication image data and the sound data corresponding to the incoming message stored in the data storage unit, to the second device.

* * * * *